United States Patent
McLean et al.

(10) Patent No.: US 11,590,462 B2
(45) Date of Patent: Feb. 28, 2023

(54) LIQUID AERATION

(71) Applicant: John Barrie Meikle, Cheshire (GB)

(72) Inventors: Fiona Marie McLean, Cheshire (GB); John Barrie Meikle, Cheshire (GB)

(73) Assignee: John Barrie Meikle, Cheshire (GB)

( * ) Notice: Subject to any disclaimer, the term of this patent is extended or adjusted under 35 U.S.C. 154(b) by 503 days.

(21) Appl. No.: 16/625,747

(22) PCT Filed: Jun. 27, 2017

(86) PCT No.: PCT/US2017/039398
§ 371 (c)(1),
(2) Date: Dec. 22, 2019

(87) PCT Pub. No.: WO2019/005004
PCT Pub. Date: Jan. 3, 2019

(65) Prior Publication Data
US 2020/0206698 A1  Jul. 2, 2020

(51) Int. Cl.
*B01F 23/23* (2022.01)
*B01F 23/2361* (2022.01)
(Continued)

(52) U.S. Cl.
CPC ........ *B01F 23/2361* (2022.01); *B01F 23/236* (2022.01); *B01F 25/31242* (2022.01); *B01F 23/234* (2022.01); *B01F 23/237611* (2022.01); *B01F 33/5011* (2022.01); *B01F 2101/16* (2022.01); *B01F 2101/17* (2022.01)

(58) Field of Classification Search
CPC ................ B01D 23/23; B01D 23/2312; B01D 23/236; B01D 23/2361; B01F 23/23; B01F 23/2312; B01F 23/236; B01F 23/2361
See application file for complete search history.

(56) References Cited

U.S. PATENT DOCUMENTS

| 3,399,811 A | 9/1968 | Miller |
| 7,614,513 B2 | 11/2009 | Anderson |
(Continued)

OTHER PUBLICATIONS

International Preliminary Report on Patentability for Application No. PCT/US2017/039398 dated Jan. 4, 2018 (10 pages).
(Continued)

*Primary Examiner* — Robert A Hopkins
(74) *Attorney, Agent, or Firm* — Michael Best & Friedrich LLP

(57) ABSTRACT

An aerator for aerating a liquid as the liquid is being poured from a container includes an aerator body configured to be at least partially inserted into the container. The body includes an inlet, an outlet, and a flow control chamber disposed between the inlet and the outlet. A flow control element is movably disposed in the flow control chamber between a first position where the flow control element is spaced away from a stop and a second position where the flow control element engages the stop. The flow control chamber communicates with the outlet when the flow control element is in the second position allowing liquid to be poured from the container and allowing air to be introduced into the flow control chamber for mixing with the liquid being poured from the container to aerate the liquid being poured from the container.

19 Claims, 32 Drawing Sheets

(51) Int. Cl.
  *B01F 25/312* (2022.01)
  *B01F 23/236* (2022.01)
  *B01F 23/234* (2022.01)
  *B01F 23/237* (2022.01)
  *B01F 33/501* (2022.01)
  *B01F 101/16* (2022.01)
  *B01F 101/17* (2022.01)

(56) References Cited

U.S. PATENT DOCUMENTS

| | | |
|---|---|---|
| 9,399,197 B2 * | 7/2016 | Graham ................ B65D 47/06 |
| 2008/0282908 A1 | 11/2008 | Cole et al. |
| 2012/0067842 A1 | 3/2012 | Keller |
| 2013/0319253 A1 | 12/2013 | Smith |
| 2014/0076934 A1 | 3/2014 | Laib et al. |
| 2014/0284823 A1 | 9/2014 | Fraser |

OTHER PUBLICATIONS

International Search Report with Written Opinion for related Application No. PCT/US2017/039398 dated Jan. 4, 2018 (13 Pages).

* cited by examiner

LIQUID AERATION

CROSS-REFERENCE TO RELATED APPLICATIONS

This application is a U.S. national stage entry of International Application No. PCT/US2017/039398, filed Jun. 27, 2017, the entire contents all of which are hereby incorporated by reference herein.

FIELD

The present invention generally relates to the aeration of liquid within a bottle, and more particularly to an aerator assembly for aerating liquid within and/or when being poured from a bottle.

BACKGROUND

The benefits of wine aeration are well known. Within the wine community, proper aeration of wine, and in particular red wine, prior to consumption, is thought to be essential to capturing the full wine tasting experience. It is desirable to aerate wine, and in particular red wine, to enhance the aroma, bring out the full flavor of the wine, and enhance the "mouth feel" of the wine by providing the wine with a softer feel and a lighter texture. Wine aerators may use the Venturi principle to draw air into the aerator for mixing with wine as the wine is poured through the aerator. There are various types of wine aerators but they generally fall into one of three categories: handheld or stand-alone aerators, in-glass/decanter aerators, and in-bottle aerators. Handheld/stand-alone aerators are positioned above a glass and wine is poured from the bottle into the aerator where the wine is aerated prior to entering the glass. Handheld/stand-alone aerators can generally maximize aeration of the wine but are often cumbersome and bulky. In-glass/decanter aerators operate similarly to handheld/stand-alone aerators. However, in-glass/decanter aerators sit in the mouth of the glass/decanter so wine can be poured through the aerator and into the glass/decanter. In-bottle aerators are the most convenient in that they fit, at least partially, inside the bottle so that the aerator is directly coupled to the bottle. In-bottle aerators, however, are not capable of providing the same level of aeration that is accomplished with handheld/stand-alone and in-glass/decanter aerators.

SUMMARY

In one aspect, an aerator for aerating a liquid as the liquid is being poured from a container generally comprises an aerator body configured to be at least partially inserted into the container. The body comprises an inlet, an outlet, and a flow control chamber disposed between the inlet and the outlet. The flow control chamber is at least partially defined by a stop adjacent the outlet. The flow control chamber is configured to pass liquid from the container when the aerator is inserted into the container and the container oriented for pouring liquid from the container. A flow control element is movably disposed in the flow control chamber between a first positon where the flow control element is spaced away from the stop and a second position where the flow control element engages the stop. The flow control element moves to the second position when the container is oriented for pouring liquid from the container. The flow control chamber communicates with the outlet when the flow control element is in the second position allowing liquid to be poured from the container and allowing air to be introduced into the flow control chamber for mixing with the liquid being poured from the container to aerate the liquid being poured from the container.

In another aspect, an aerator assembly generally comprises an aerator configured to be at least partially inserted into a bottle for aerating liquid in the bottle as the liquid is being poured from the bottle. A mount is releaseably attachable to the aerator. The mount is configured to attach the aerator to a cap for the bottle. The releaseable attachment between the mount and aerator causes the mount to detach from the aerator when the cap is removed from the bottle retaining the mount with the cap and leaving the aerator at least partially in the bottle.

In yet another aspect, a method of making an aerator assembly generally comprises providing an aerator including an aerator body. The aerator is configured to be at least partially inserted into a bottle for aerating liquid in the bottle as the liquid is being poured from the bottle. Releaseably attaching a mount to the aerator. The mount is configured to attach the aerator to a cap of the bottle.

In still another aspect, a shell assembly generally comprises a shell having a bead formed therein. An aerator is configured to be at least partially inserted into a bottle for aerating liquid in the bottle as the liquid is being poured from the bottle. The aerator comprises a body and an attachment member attached to the body. The attachment member is configured to engage the bead of the shell to retain the aerator to the shell.

In another aspect, a method of making a shell assembly generally comprises providing a shell having a bead formed therein. Providing an aerator including an aerator body and an attachment member attached to the body. The aerator is configured to be at least partially inserted into a bottle for aerating liquid in the bottle as the liquid is being poured from the bottle. Securing the aerator to the shell by inserting the aerator into the shell and engaging the attachment member with the bead of the shell to retain the aerator to the shell.

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF THE PREFERRED EMBODIMENTS

Figure 1:
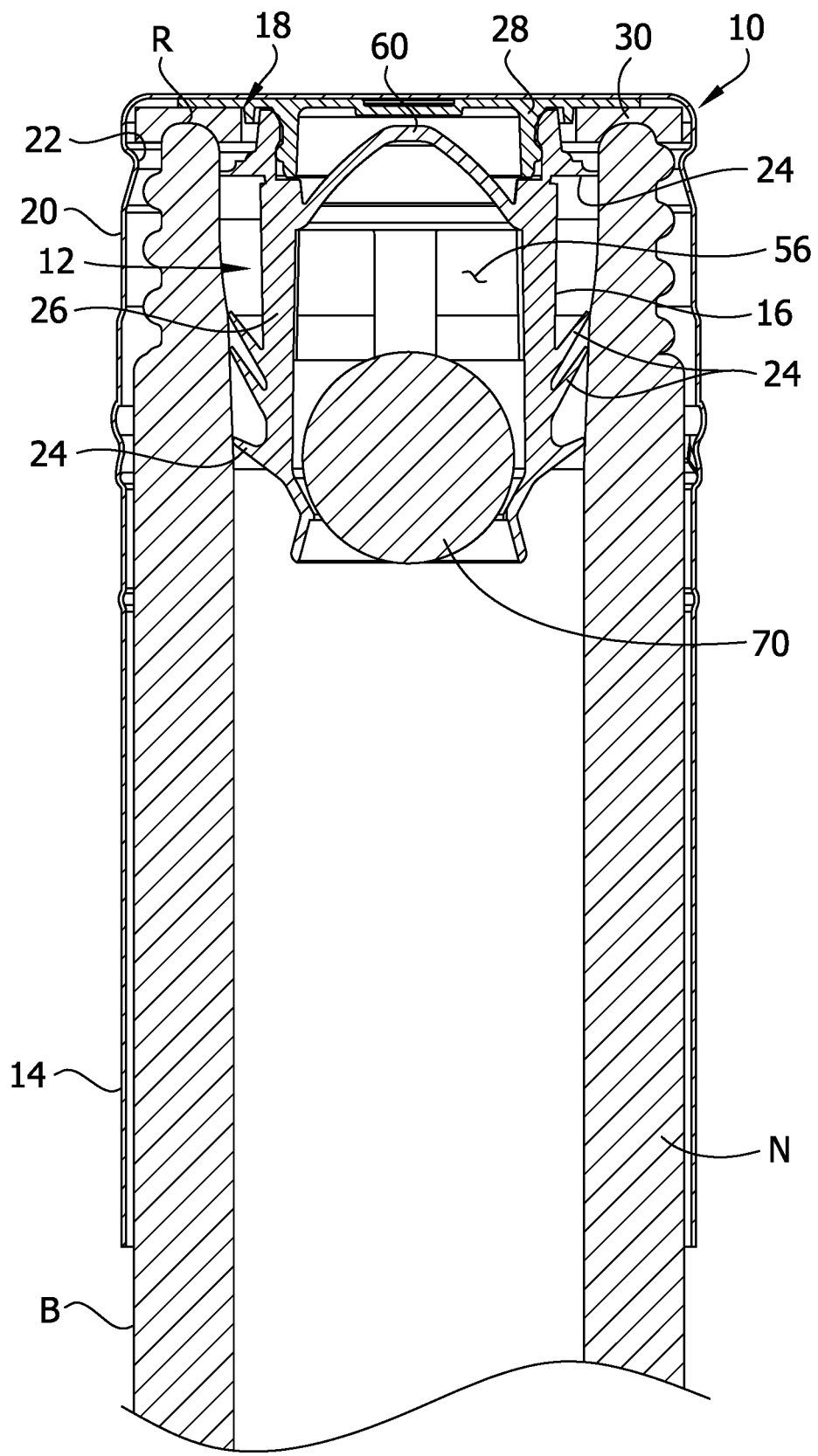
FIG. 1 is a section of a shell assembly mounted on a neck of a bottle.

Referring to FIGS. 1-5, a shell assembly, generally indicated at 10, is mounted on a neck N of a container or bottle B for locating an aerator assembly, generally indicated 12, at least partially in the neck of the bottle for aerating liquid L (FIG. 15) in the bottle when the liquid is poured from the bottle. The shell assembly 10 comprises a shell 14 and the aerator assembly 12. The aerator assembly 12 comprises an aerator 16 and mount assembly 18 releasably attached to the aerator. During the bottling process, the shell assembly 10 is placed on the neck N of the bottle B in the same manner as shells in the prior art. For example, the shell assembly 10 is pressed onto the neck N of the bottle B and rollers engage an outer surface of the shell 14 to form mating threads in the shell with threads T on the bottle as is understood by persons skilled in the art. However, in addition, shell assembly 10 is configured to locate the aerator 16 of the aerator assembly 12 at least partially in the neck N of the bottle B during the bottling process. The releasable attachment between the mount assembly 18 and the aerator 16 allows the mount assembly to detach from the aerator when a cap portion 20 of the shell 14 is removed from the bottle B (FIGS. 6 and 7), leaving the aerator 16 in the neck N of the bottle. With the aerator 16 disposed in the bottle B, liquid L in the bottle can flow through the aerator and be aerated as the liquid is being poured from the bottle. In one embodiment, the liquid L in the bottle B is wine. It will be envisioned that the shell assembly 10 and aerator assembly 12 can be used with bottles containing other liquids without departing from the scope of the disclosure.

In FIGS. 1-5, the shell assembly 10 and bottle B are shown prior to forming threads on the shell 14 and prior to opening the bottle for the first time. In this configuration, the cap portion 20 of the shell 14 forms part of a one-piece structure with the remainder of the shell as perforations 21 which connect the cap portion to the remainder of the shell are still intact. The mount assembly 18 is attached to the aerator 16 by a releaseable snap fit connection and mounts the aerator assembly 12 to the shell 14. The mount assembly 18 is retained to the cap portion 20 of the shell 14 by a bead 22 in the shell. The interaction between the mount assembly 18 and the bead 22 is sufficient to hold the aerator assembly 12 in the shell 14 as the shell assembly 10 is transported during the bottling process. However, the mount assembly 18 can be retained in the cap portion 20 by any suitable means such as by adhesive.

Figure 6:
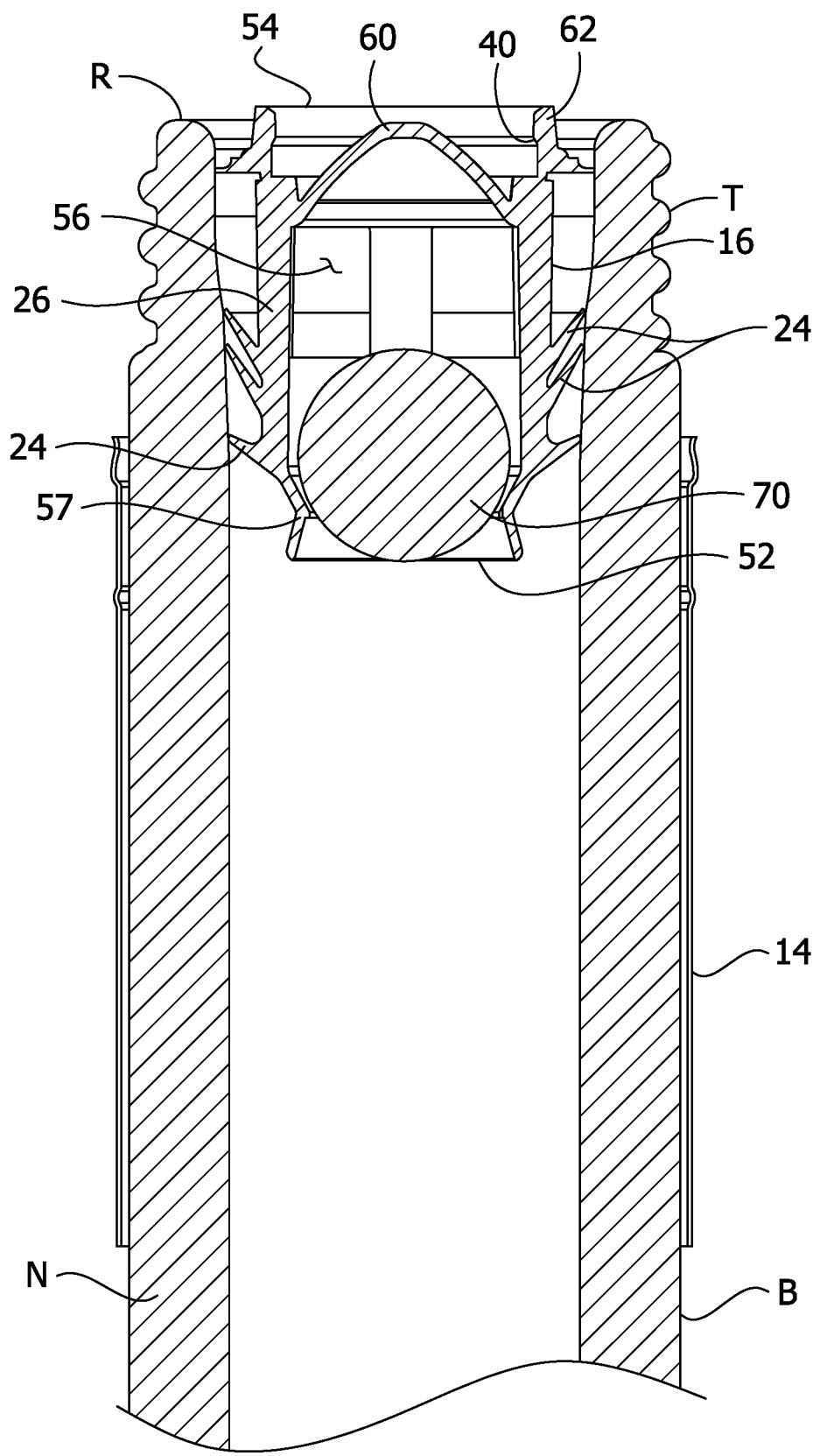
FIG. 6 is the section of FIG. 1 with a cap assembly of the shell assembly removed.

The aerator 16 is secured within the neck N of the bottle B by flanges 24 on a body 26 of the aerator or other known retention means. The flanges 24 are sized to provide a frictional engagement force with an interior diameter of the neck N of the bottle B that is stronger than the snap fit connection between the mount assembly 18 and the aerator 16. For example, at least some of the flanges 24 are configured to flex upwardly when the aerator 16 is inserted into the neck N of the bottle B providing a resistive force against pulling the aerator 16 out of the bottle. In the illustrated embodiment, the bottom three flanges 24 are flexed upwardly while the top flange 24 is sized to remain substantially horizontal inside the neck N. Thus, when the cap portion 20 of the shell 14 is removed from the shell and bottle B, the mount assembly 18 detaches from the aerator 16 leaving the aerator 16 in the neck N of the bottle B (FIG. 6).

Figure 2:
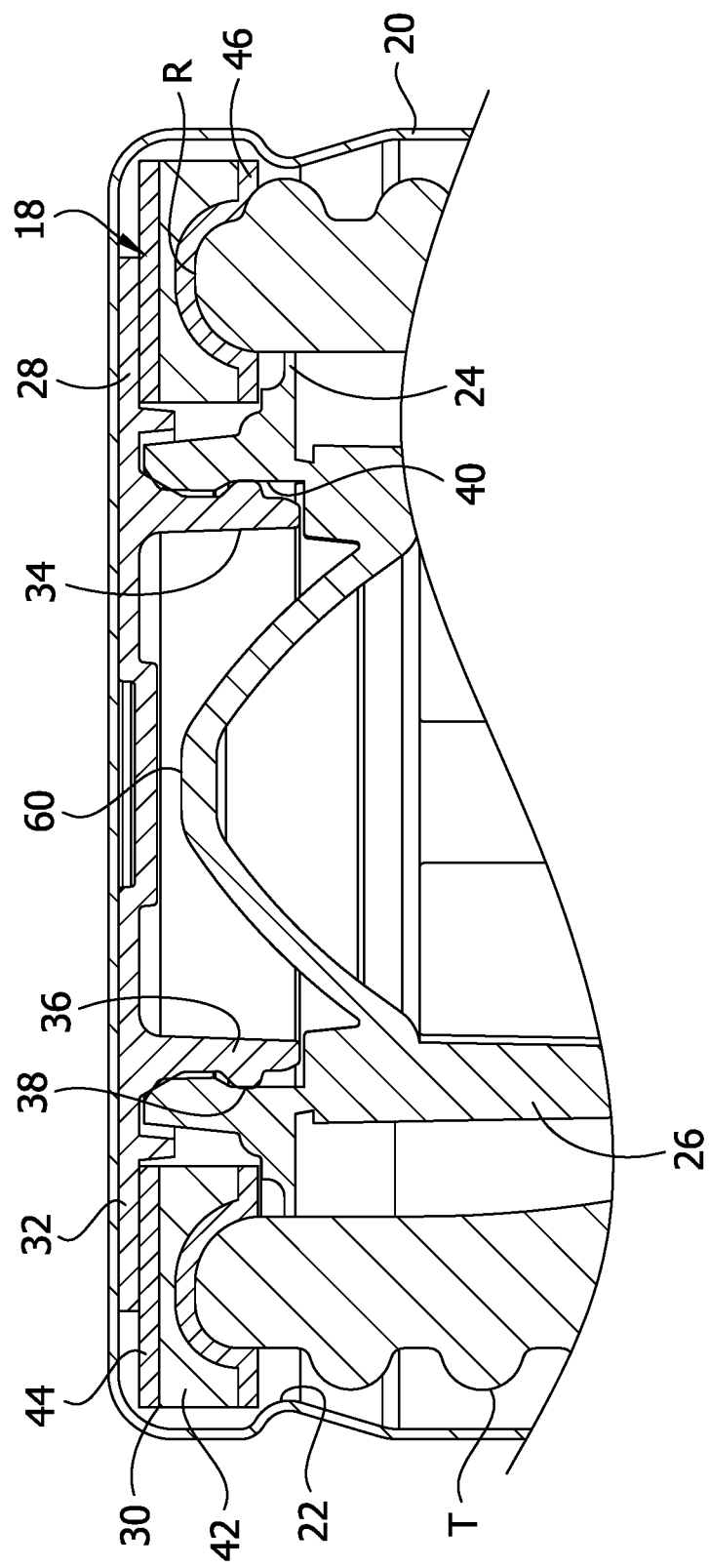
FIG. 2 is an enlarged fragmentary view of FIG. 1.
Figure 3:
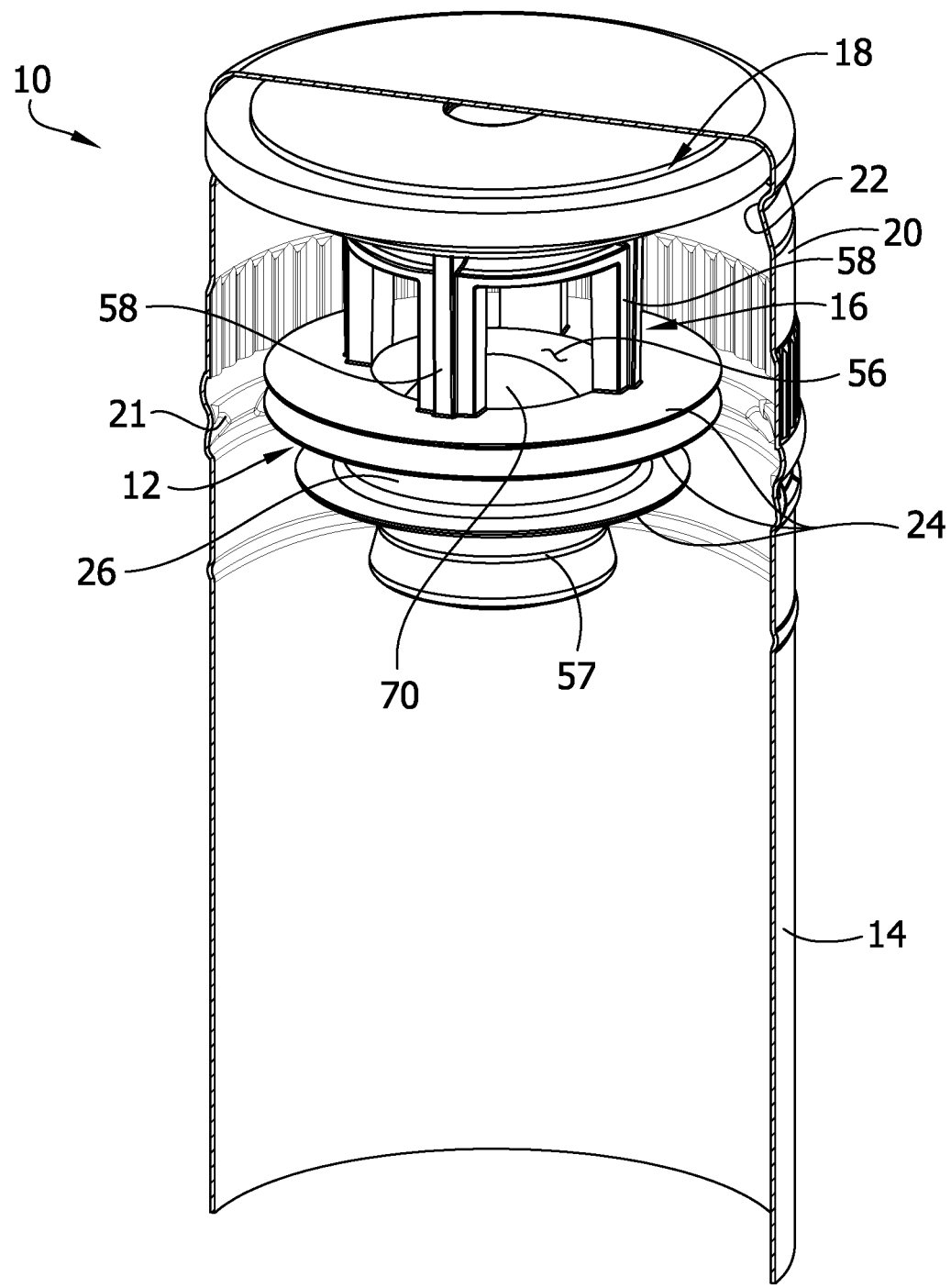
FIG. 3 is a perspective of the shell assembly with portions of a shell broken away to show an aerator assembly inside the shell.
Figure 4:
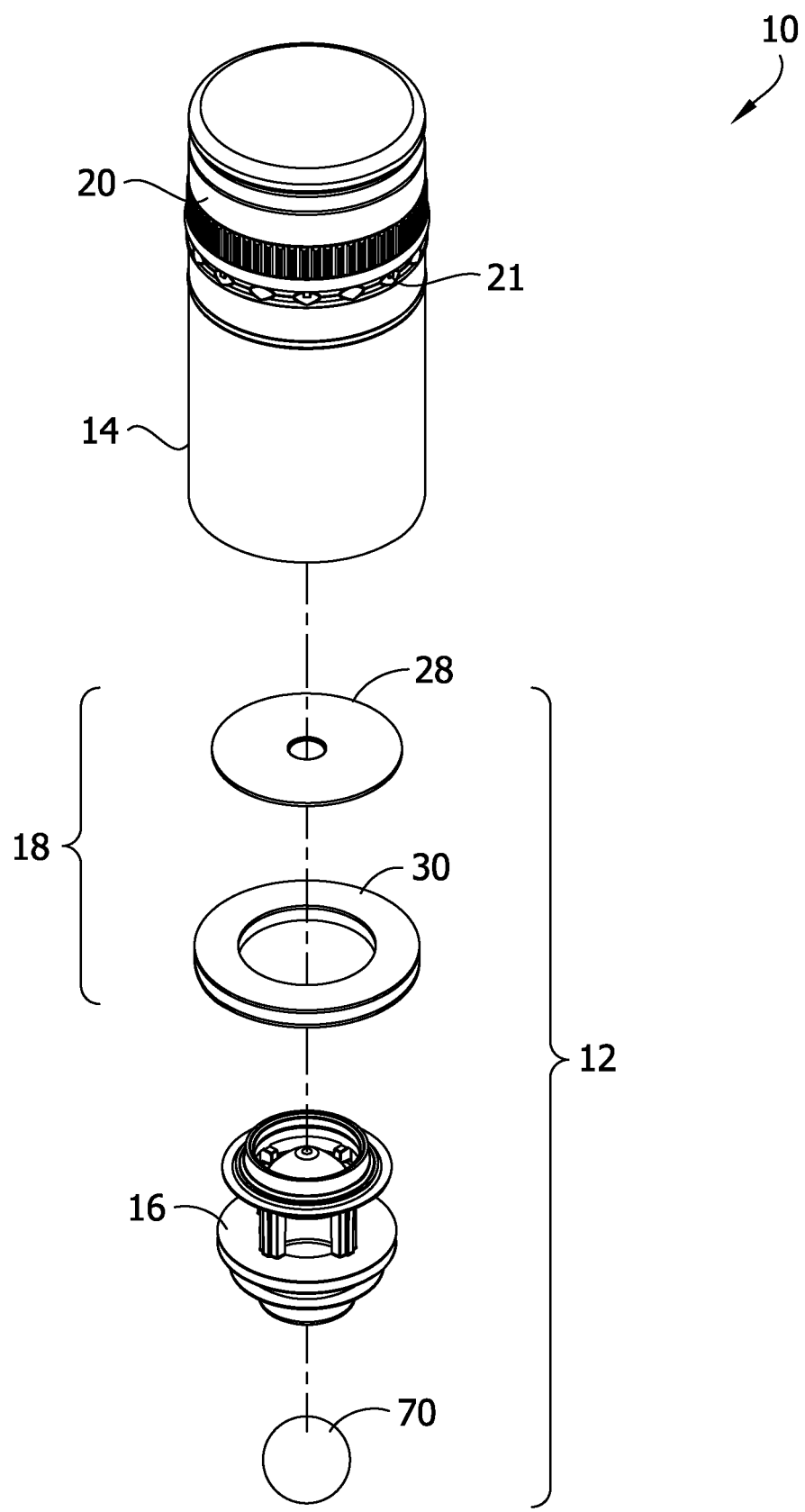
FIG. 4 is an exploded view of the shell assembly.
Figure 5:
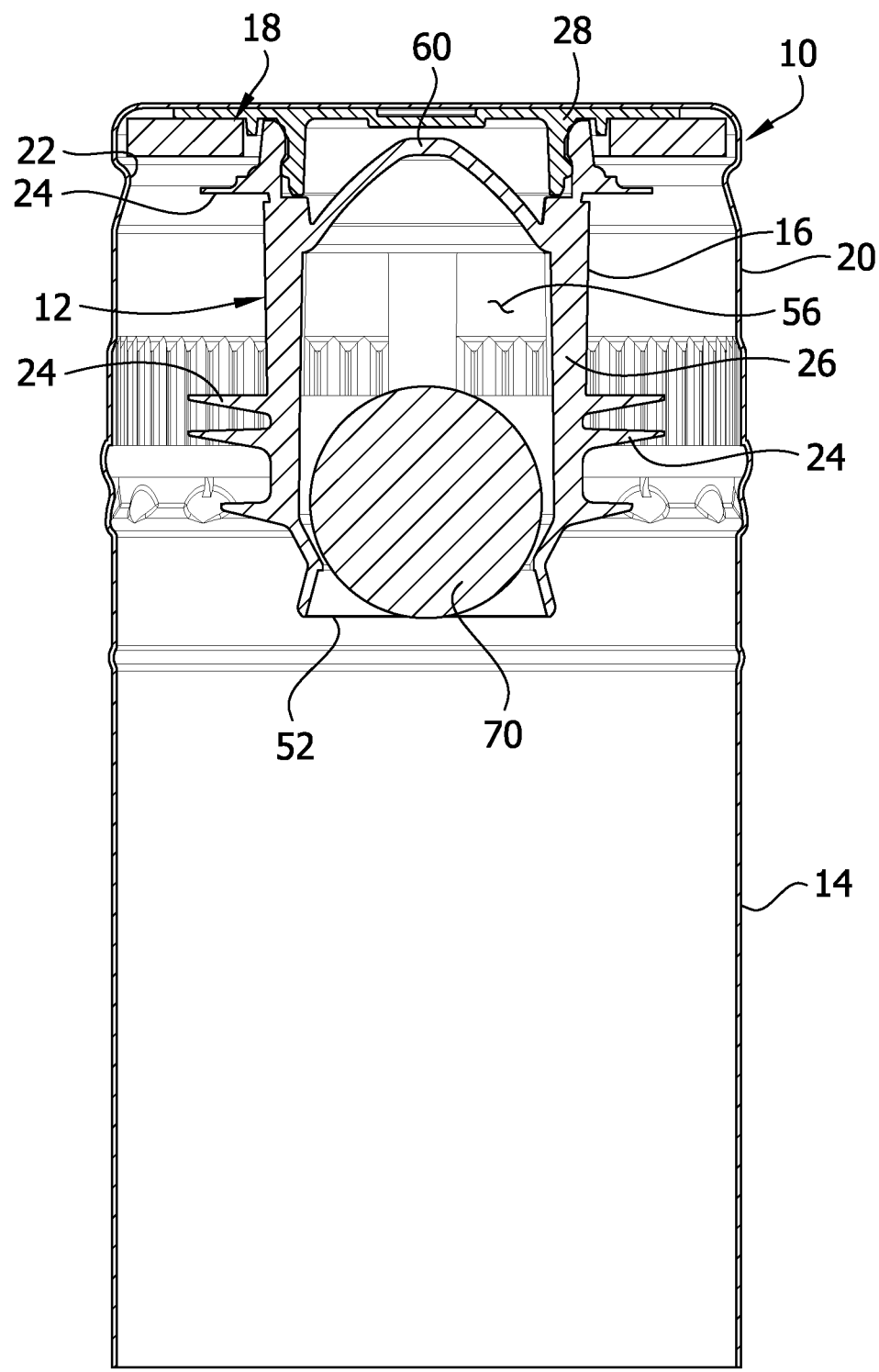
FIG. 5 is a section of the shell assembly.
Figure 13:
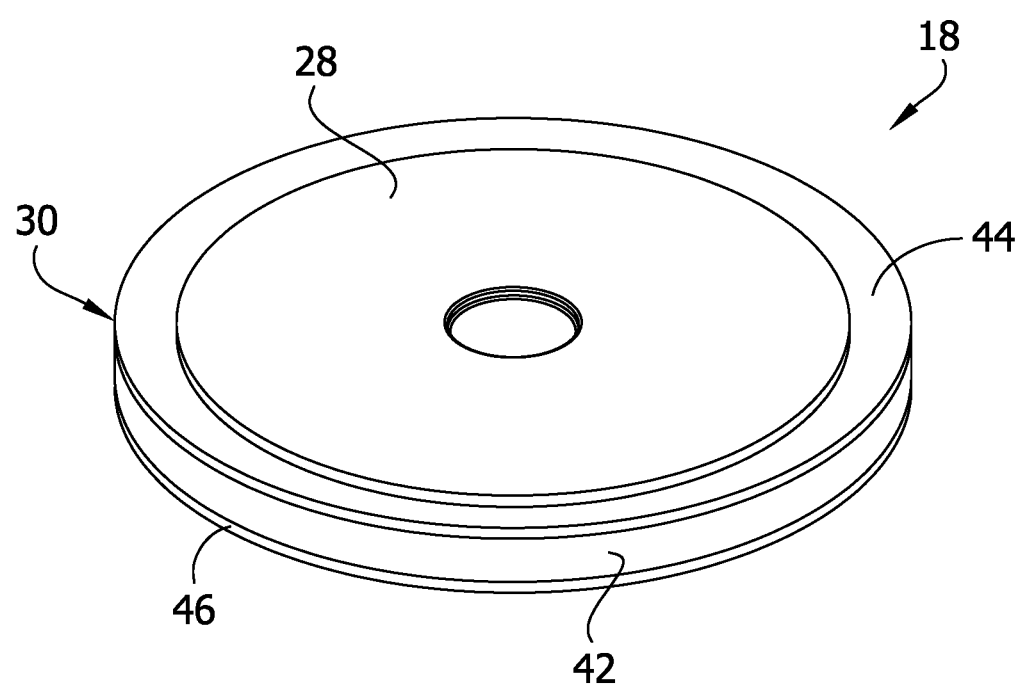
FIG. 13 is a perspective of the mount assembly.
Figure 14:
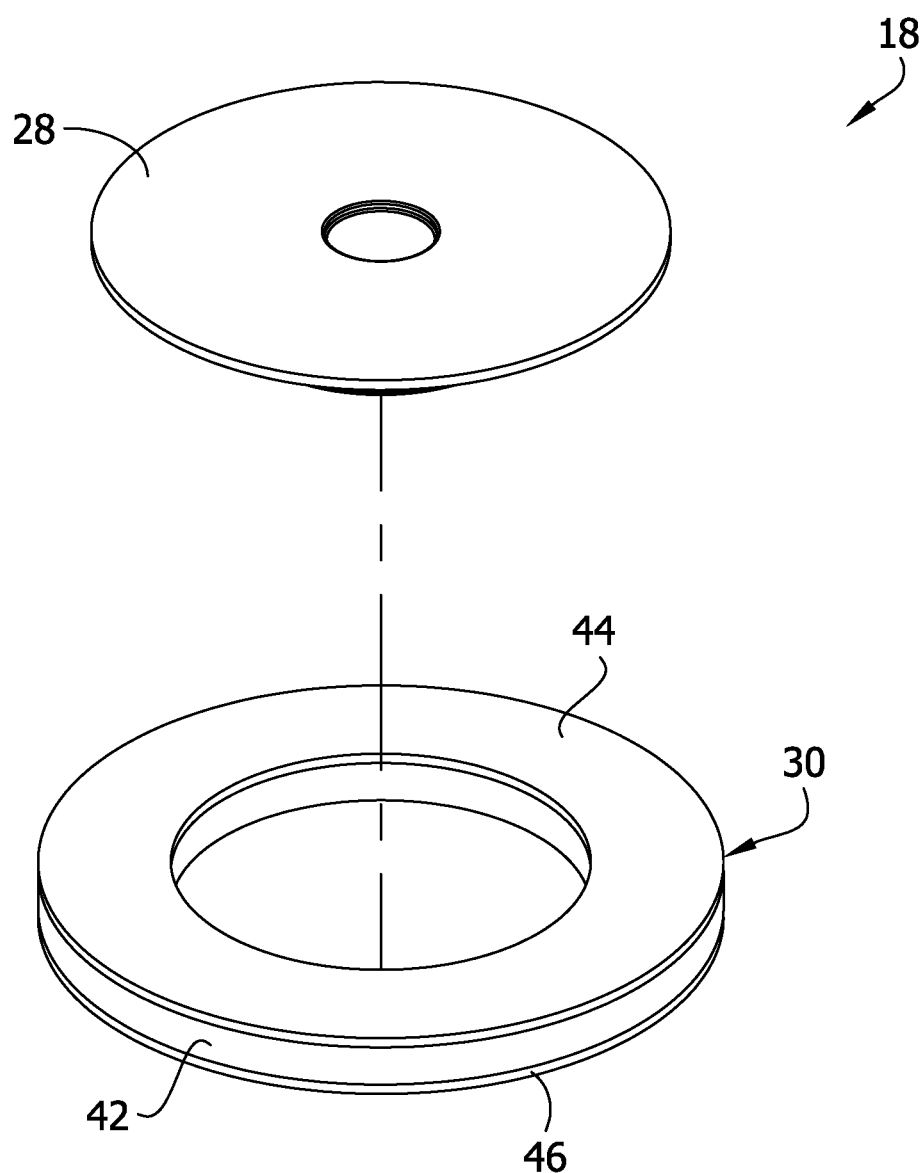
FIG. 14 is an exploded view of the mount assembly.

Referring to FIGS. 2, 13, and 14, the mount assembly 18 comprises a mount 28 and a seal 30. The mount 28 comprises a cap attachment portion 32 and an aerator attachment portion 34 formed integrally with the cap attachment portion. The cap attachment portion 32 comprises a circular disc member and the aerator attachment portion 34 comprises an annular projection 36 extending from a bottom surface of the cap attachment portion. A circumferential rib 38 is formed on the annular projection 36. The rib 38 is configured to be received in a groove 40 in the body 26 of the aerator 16 to releaseably attach the mount assembly to the aerator. It will be understood that the rib 38 could be formed on the aerator 16 and the groove 40 could be formed in the mount 28 without departing from the scope of the disclosure. The projection 36 and rib 38 provide the releaseable snap fit connection between the mount 28 and the aerator 16. The connection between rib 38 and groove 40 is not a friction fit as there is some tolerance for movement and rotation between the mount 28 and aerator 16 when the snap fit is engaged. This movement facilitates locating the aerator 16 in the neck N of the bottle B during the bottling process. In particular, when the shell assembly 10 is pressed onto the neck N of the bottle B, the aerator 16 can adjust itself within the neck as the aerator is being inserted into the bottle.

The seal 30 has an annular shape and is located opposite the bottom surface of the cap attachment portion 32 and around the aerator attachment portion 34 of the mount 28. The seal 30 is configured to interact with the bead 22 in the cap portion 20 of the shell 14 to retain the mount assembly 18 within the cap portion of the shell. The seal 30 may comprise known sealing technology such as a laminate comprising a combination of extruded expanded polyethylene (EPE) or polyvinylidene chloride (PVdC) disposed between tin and/or aluminum layers. Other oxygen barrier combinations may also be used. In the illustrated embodiment, the seal comprises a ring member 42 having a top tin layer 44 and a bottom tin layer 46. In one embodiment, the seal 30 has an outer diameter at least equal to an outer diameter of the cap attachment portion 32 of the mount 28. In another embodiment, the seal 30 has an outer diameter that is greater than an outer diameter of the cap attachment portion 32 of the mount 28. In one embodiment, the mount 28 and aerator 16 each comprise molded plastic components. However, the mount 28 and aerator 16 could be formed from other materials without departing from the scope of the disclosure. Additionally, while the seal 30 is shown as an annular member having a center hole to receive the aerator attachment portion 34 of the mount 28, the seal could be disk shaped such that there is no center hole in the seal. In this embodiment, the disk shaped seal could be retained in the shell 14 in the same manner as seal 30, and the aerator 16 could be attached to the seal by a clip secured to the seal by suitable means such as by adhesive.

As shown in FIG. 2, the seal 30 is configured to engage a rim R of the bottle B and the cap portion 20 of the shell 14 to seal the interior of the bottle. The seal 30 may be compressed and conform around the rim R of the bottle when the shell assembly 10 is attached to the bottle B during the bottling operation. A top pressure on the shell 14 may force the seal 30 into intimate contact with the rim R of the bottle B and an inner surface of the cap portion 20 of the shell 14. For example, the bottom tin layer 46 can engage the rim R of the bottle B to provide a metal to glass contact point around the rim, and the top tin layer 44 can contact the inner surface of the cap portion 20 to provide a metal to metal contact point around the cap portion. Thus, the plastic portions of the aerator assembly 12 do not directly contact the shell 14. Therefore, there is no transmission path between the inside of the bottle B and the shell 14 permitting oxygen transmission into and out of the bottle. As a result, the mount assembly 18 forms a barrier against oxygen transmission between the interior of the bottle B and the surrounding ambient air. While metal-to-glass and metal-to-metal contact points are shown and described, it is envisioned that any combination of materials having low oxygen transmission rates could be used as the contact points between the seal, cap, and container. In one embodiment, the seal 30 provides a zero oxygen transfer rate (OTR). Thus, the seal prevents all oxygen transfer as conventionally measured between the interior of the bottle B and the ambient air. Therefore, the liquid L in the bottle B is not oxygenated after the shell assembly 10 has been finally attached to the bottle in the bottling process. However, the seal 30 could provide an OTR of greater than zero without departing from the scope of the disclosure. For example, the seal could be tuned to provide a selected amount of oxygen transfer. In one embodiment, holes could be provided in the seal to allow a selected amount of oxygen transfer between the interior of the bottle B and the ambient air. Additionally or alternatively, a coating or metallic finish (not shown) could be applied to the mount 28 to provide a similar function to the seal 30. The coating could be configured to provide a selected OTR to permit a desired amount of oxygen to enter into the bottle B. For example, the coating could be applied to the mount 28 in a selected pattern to provide a selected amount of oxygen transmission into the bottle B. Additionally or alternatively, a coating could be applied to the aerator 16 to prevent oxygen transmission into the bottle B through the aerator.

Prior to removing the cap portion 20 of the shell 14 from the bottle B, the top flange 24 seals against an inner surface of the neck N preventing liquid in the bottle from contacting the seal 30. The snap fit connection between the mount 28 and the aerator 16 also provides a liquid seal preventing liquid from contacting the seal 30. This is advantageous because liquid contact with the seal 30 may delaminate the seal compromising its ability to seal around the rim R of the bottle. Additionally or alternatively, the seal 30 could be extruded from materials that will not delaminate under liquid contact.

Figure 7:
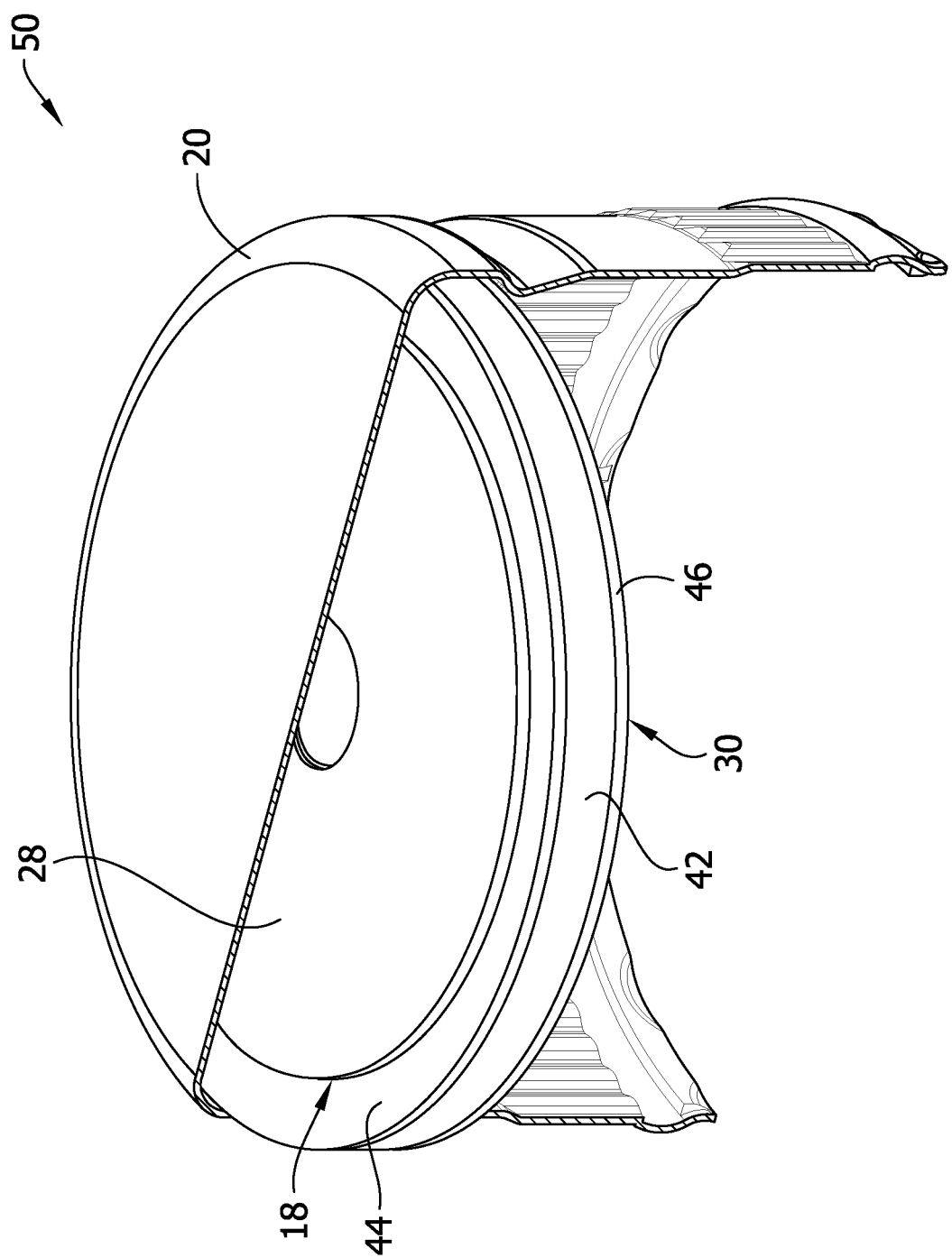
FIG. 7 is a perspective of the cap assembly with portions of a cap broken away to show a mount assembly inside the cap.
Figure 8:
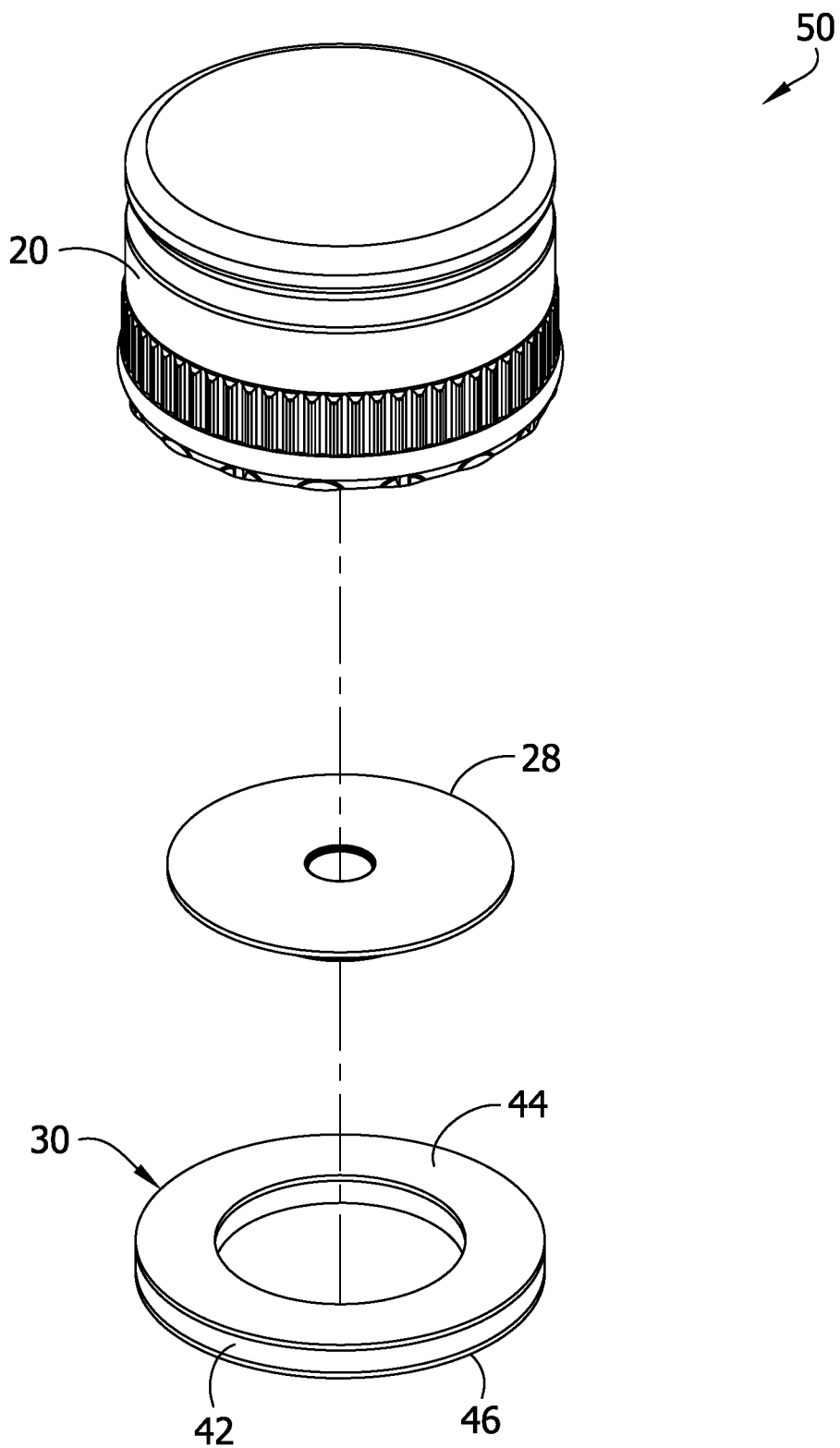
FIG. 8 is an exploded view of the cap assembly.
Figure 9:
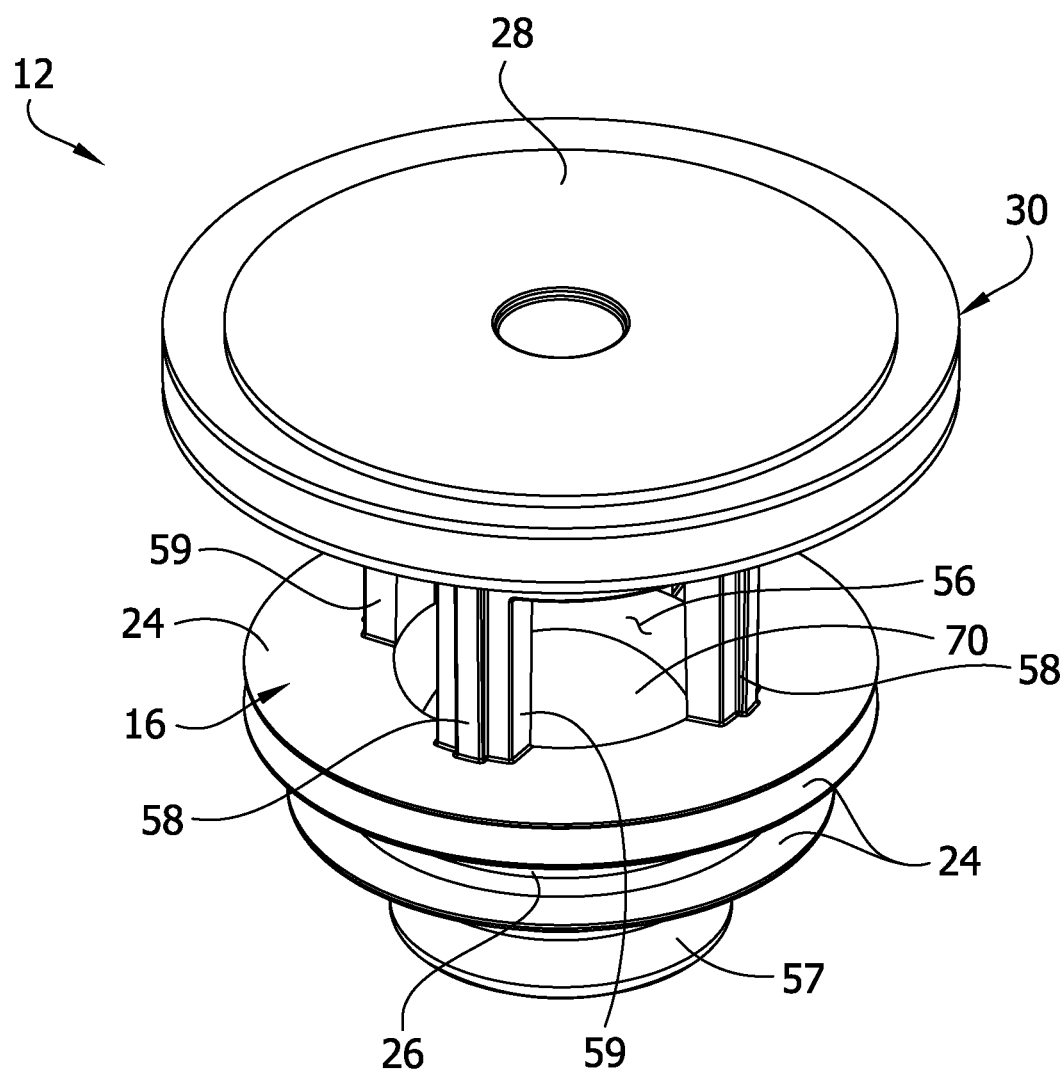
FIG. 9 is a perspective of the aerator assembly.
Figure 10:
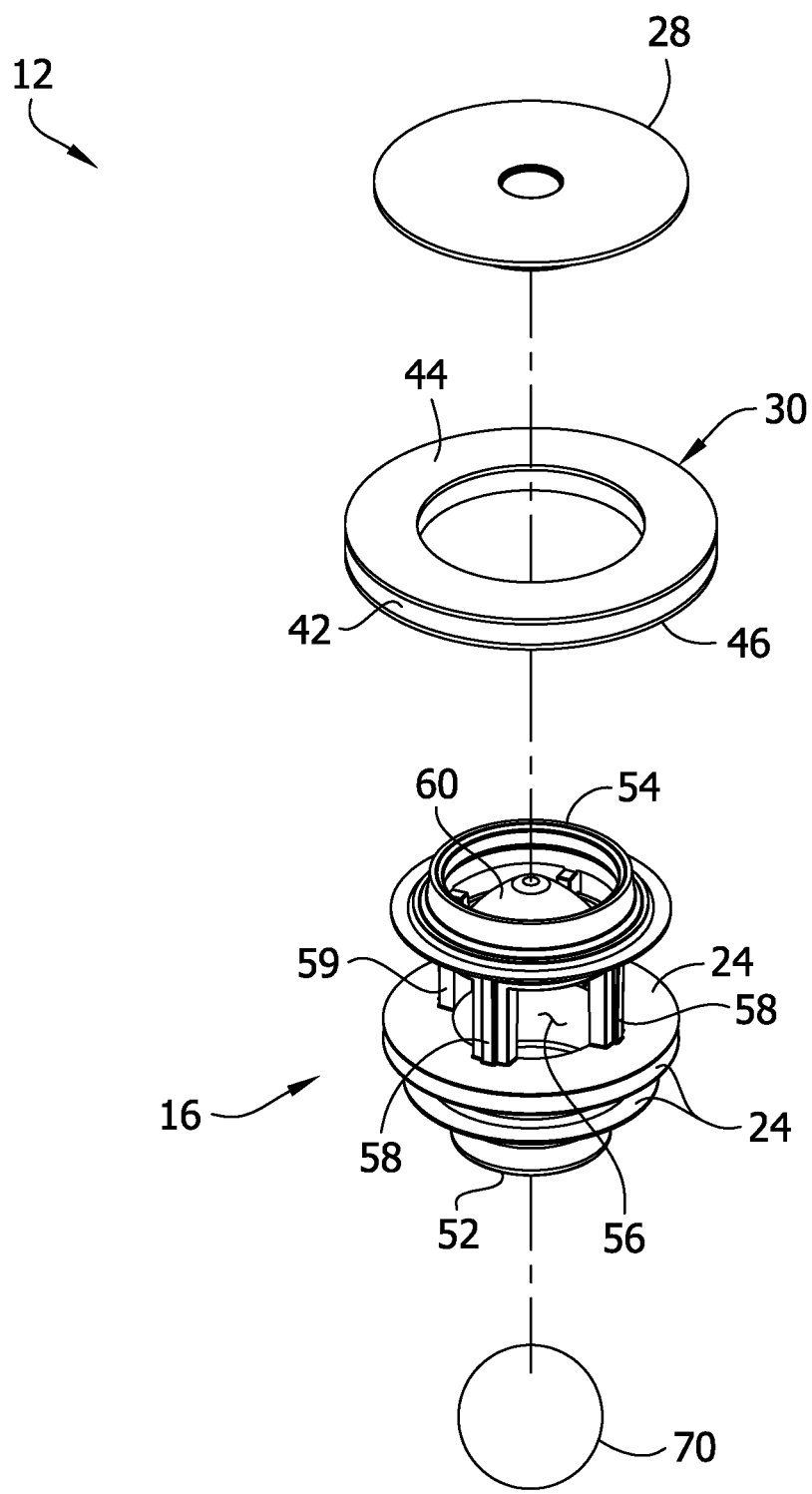
FIG. 10 is an exploded view of the aerator assembly.
Figure 11:
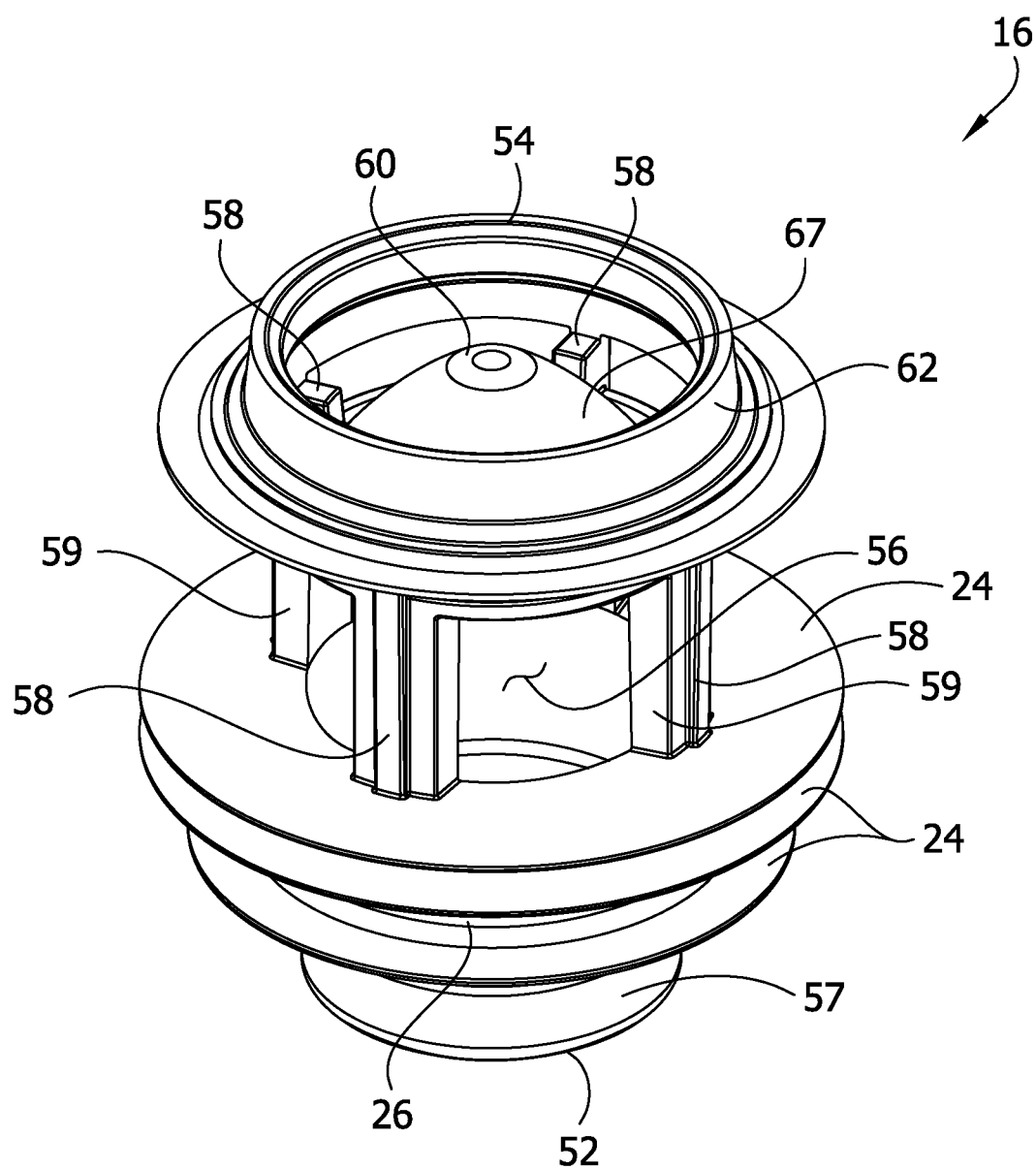
FIG. 11 is a perspective of an aerator of the aerator assembly.
Figure 12A:
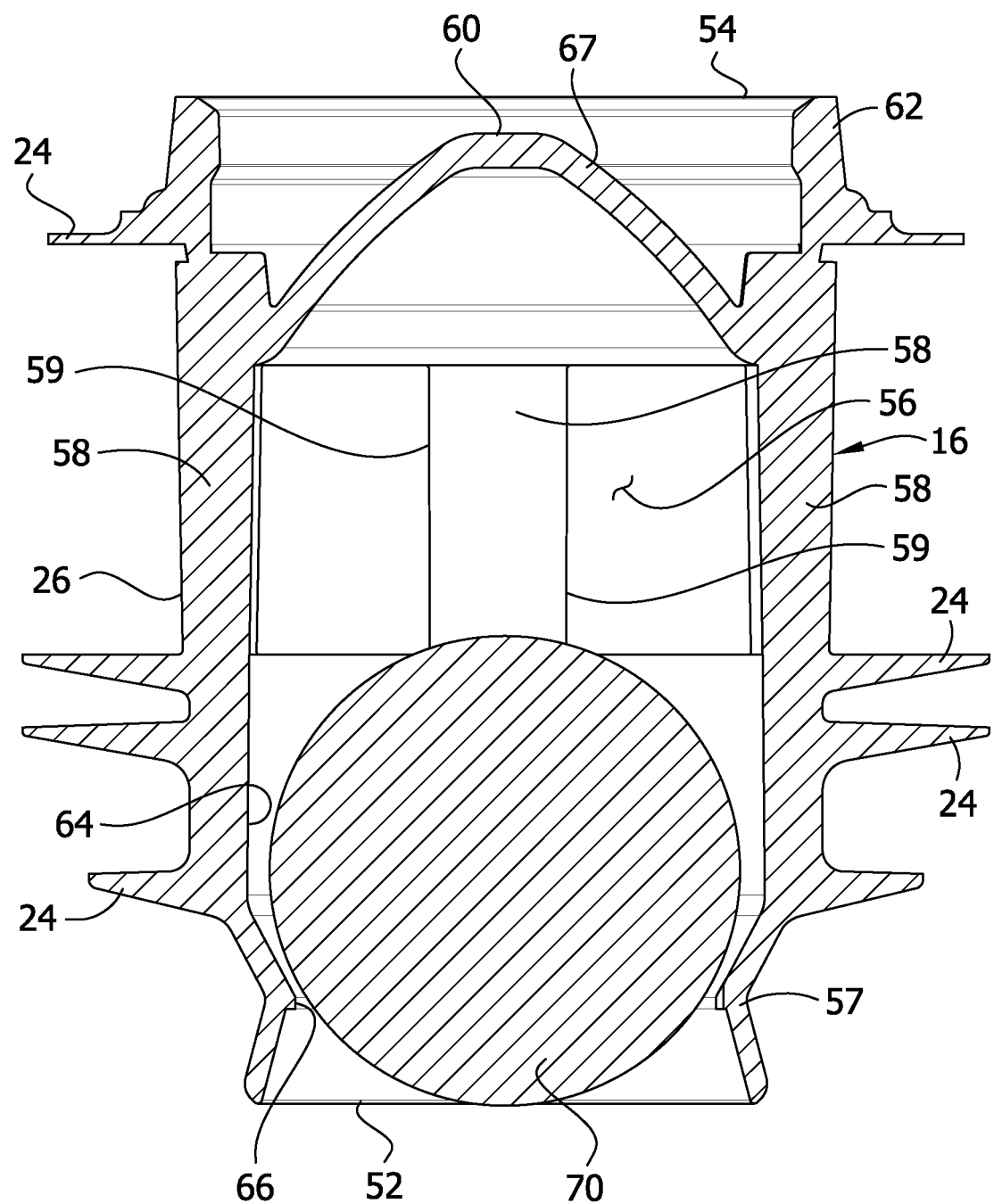
FIG. 12A is a section of the aerator in FIG. 11.
Figure 12B:
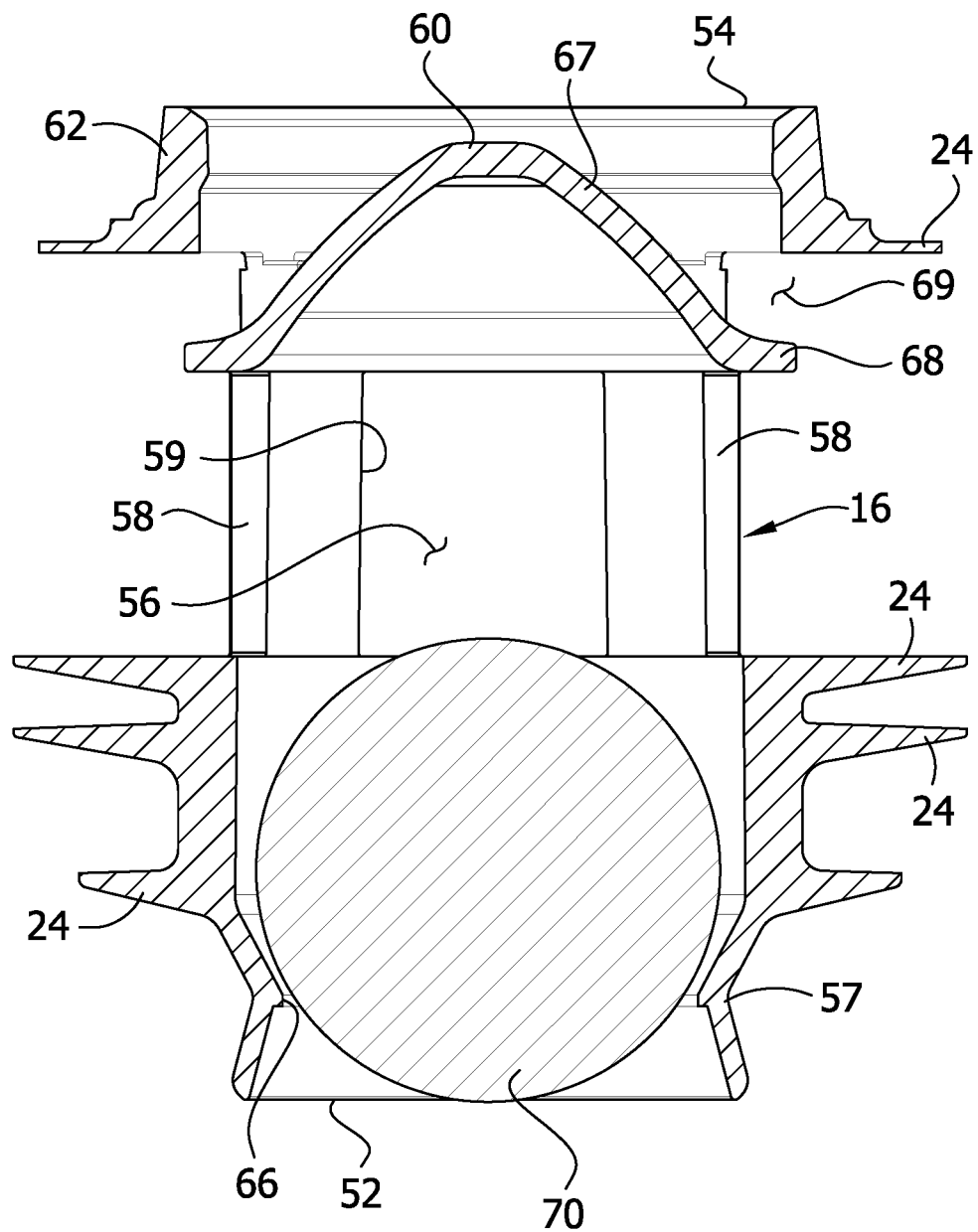
FIG. 12B is a section of the aerator in FIG. 11 taken in a plane rotated 45 degrees from the section of FIG. 12A.

Referring to FIGS. 6-8, when it is desired to open the bottle B, the perforations 21 on the shell 14 can be broken by twisting the cap portion 20 of the shell relative to the remainder of the shell to unscrew the cap portion from the bottle. When the cap portion 20 is unscrewed from the shell 14 and lifted from the bottle, the mount assembly 18 is retained within the cap portion. The cap portion 20 and mount assembly 18 are broadly a cap assembly 50 (FIGS. 7 and 8). With the cap assembly 50 removed, the aerator 16 remains in position within the neck N of the bottle B. The flanges 24 on the aerator body 26 hold the aerator 16 in the bottle B by resisting the pulling force exerted on the aerator by the action of unscrewing and lifting the cap assembly 50 from the bottle B. For example, the flanges 24 resist the force exerted by the projection 38 on groove 40 as the cap portion 20 is moved axially along the neck N to unscrew the cap portion 20. In the illustrated embodiment, the flanges 24 are sized to flex as the aerator 16 is inserted into the bottle B providing a frictional engagement with an inner surface of the neck N such that they provide sufficient resistance against pulling the aerator out of the bottle but do not resist insertion of the aerator 16 into the neck N of the bottle B during the bottling process. It will be understood that the flanges 24 can be sized as needed for the size bottle in which the aerator 16 is to be inserted. However, the flexibility of the flanges 24 configures the aerator 16 for use with substantially all regularly employed wine bottle finishes. Additionally or alternatively, the flanges 24 seal against the interior of the neck N preventing the liquid L from flowing around the inlet 52 of the aerator 16 to ensure the liquid is aerated during pouring and also may prevent the liquid from contacting the seal 30 to avoid possible delamination of the seal. For example, the flanges 24 are free of openings or cutouts that would permit fluid flow past the flanges once the aerator 16 is inserted into the bottle B. In the illustrated embodiment, the flanges 24 are formed integrally with the aerator body 26. However, the flanges 24 could be formed separately from the body 26 and suitable attached to the body without departing from the scope of the disclosure. It is also envisioned that the aerator 16 can be used separately from the mount assembly 18 and inserted into a neck of a bottle by a consumer after the bottle has been opened.

Referring to FIGS. 9-12B, the aerator body 26 includes an inlet 52 and an outlet 54. A flow control chamber 56 is disposed between the inlet 52 and outlet 54. The flow control chamber 56 is defined by a first annular wall 57, a plurality of discrete, circumferentially spaced side walls 58 extending from the annular wall toward the outlet 54, and a stop 60 disposed adjacent the outlet. The spaced apart side walls 58 form gaps 59 in the chamber 56. The side walls 58 connect the first annular wall 57 to the stop 60 and to a second annular wall 62. The first annular wall 57 defines the inlet 52 and includes a first diameter portion 64 and a second diameter portion 66 that is smaller than the first diameter portion. The second annular wall 62 defines the outlet 54. The stop 60 comprises a cone-shaped portion 67 that tapers toward the outlet 54, and a flange 68 extending around a wide end of the cone-shaped portion. The flange 68 is axially spaced from the second annular wall 62 providing a plurality of openings 69 between adjacent side walls 58 that are in communication with the gaps 59 in the flow control chamber 26 providing a fluid path between the flow control chamber 56 and the outlet 54.

Figure 15:
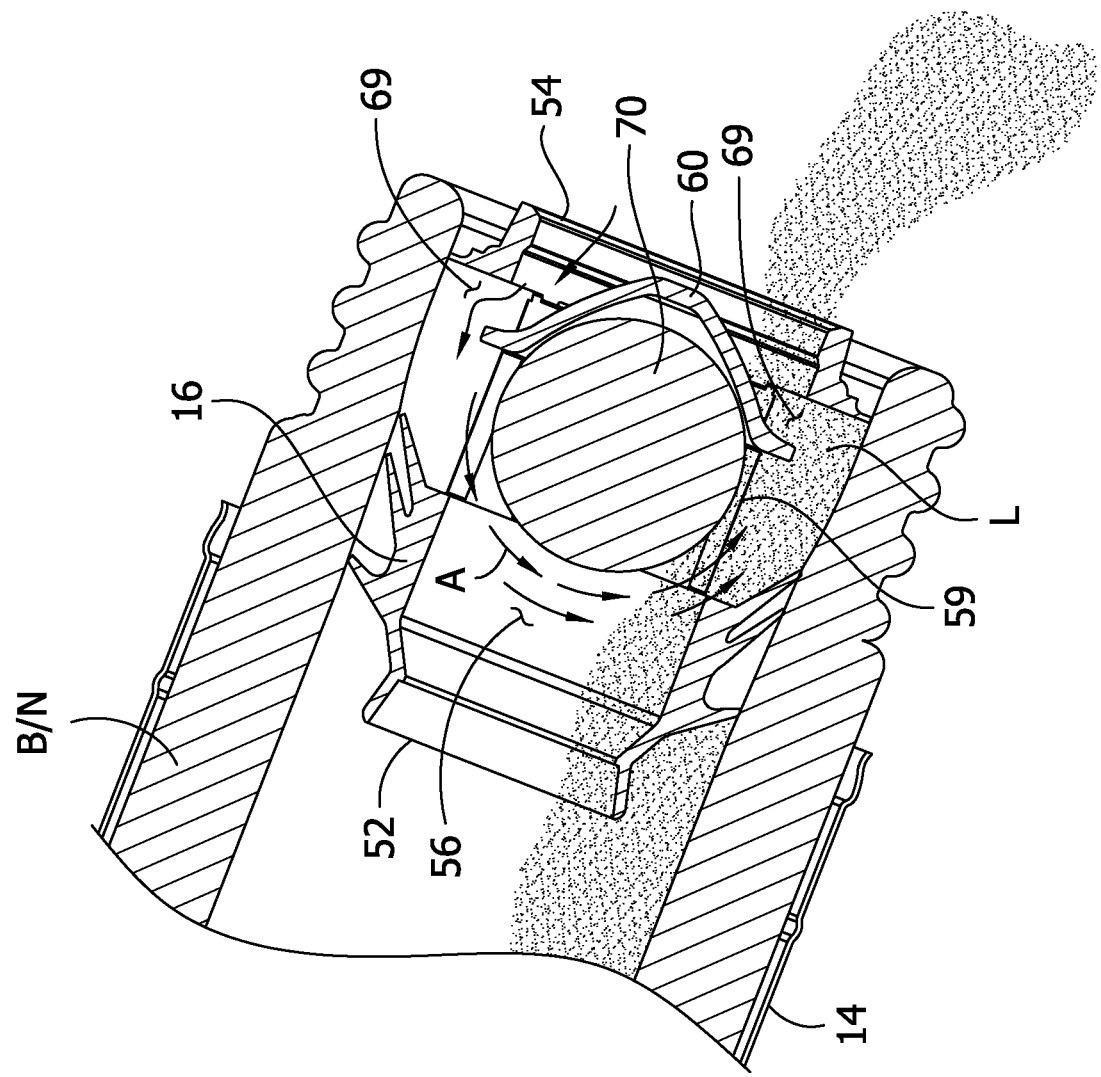
FIG. 15 is an illustration of liquid being poured from the neck of the bottle and aerated by the aerator.
Figure 16:
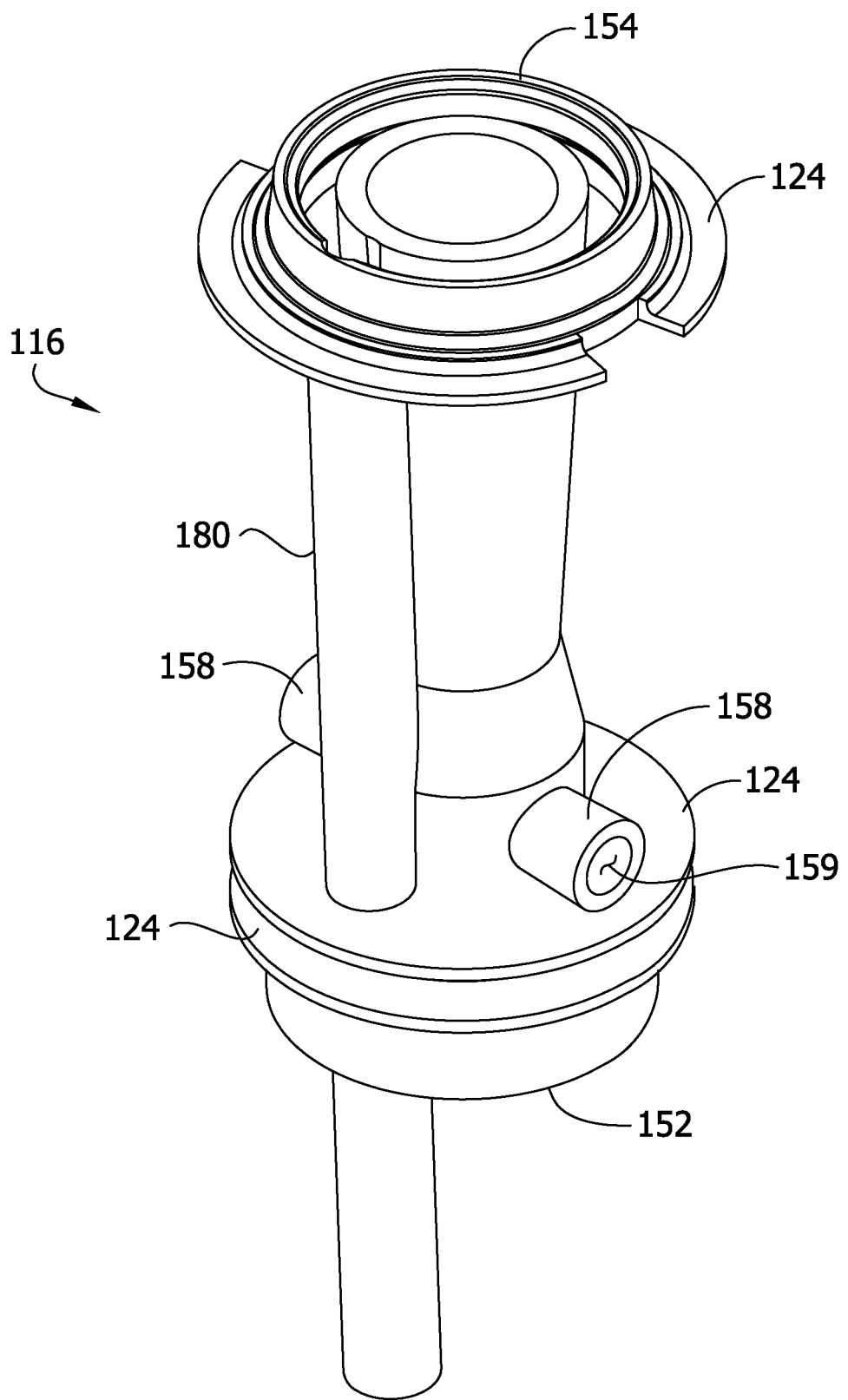
FIG. 16 is perspective of an aerator of another embodiment.
Figure 17:
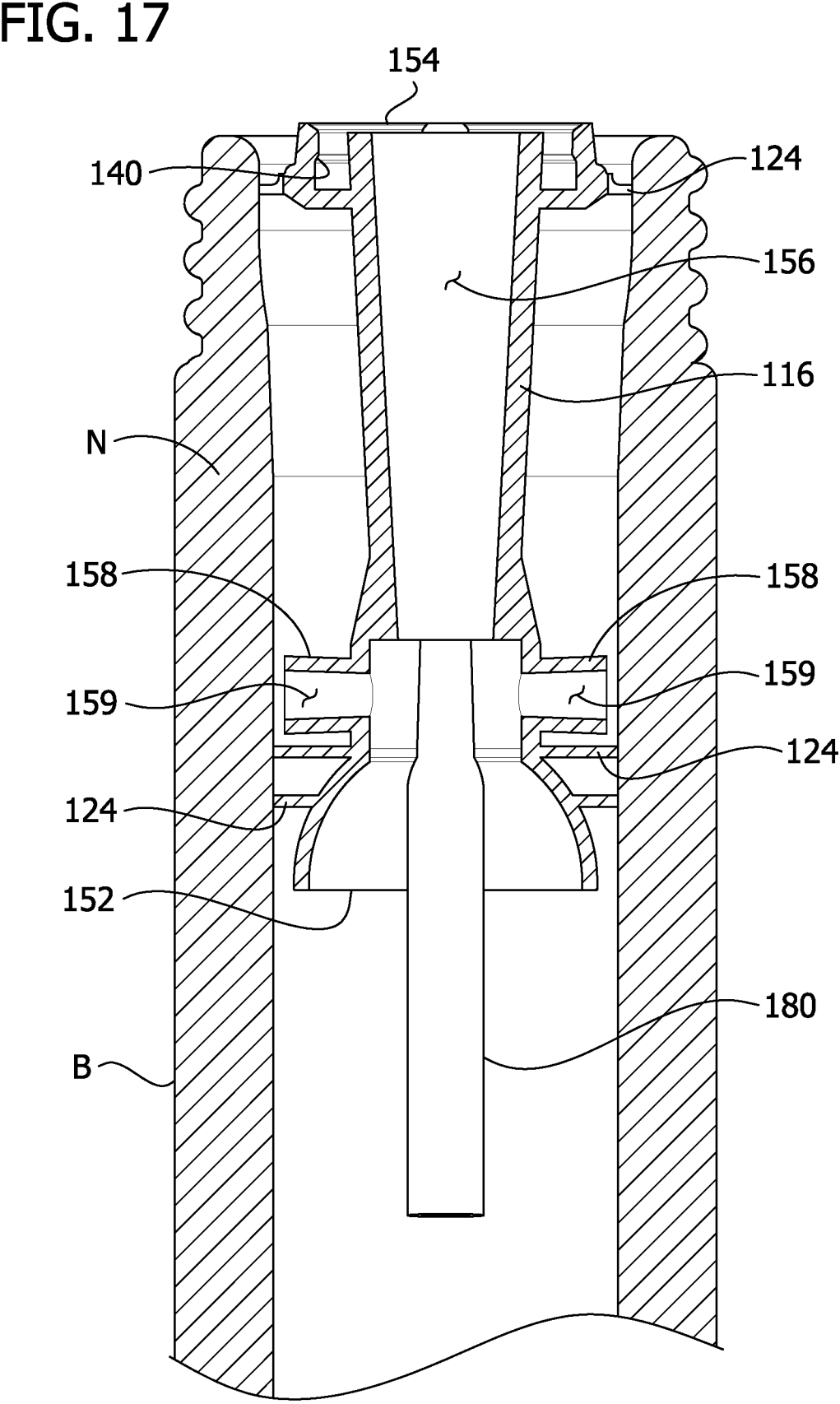
FIG. 17 is a section of the aerator of FIG. 16 mounted in a neck of a bottle.
Figure 18:
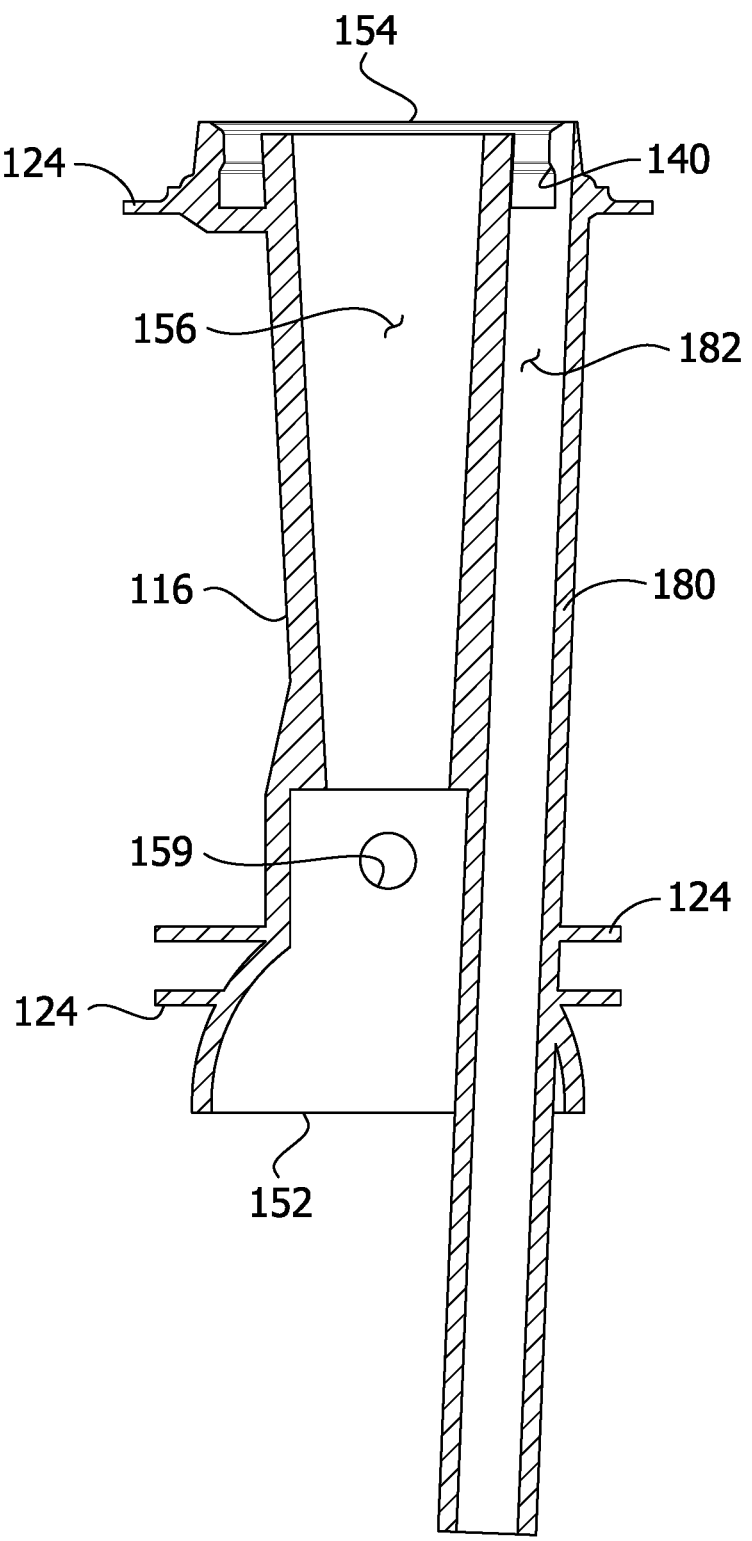
FIG. 18 is a section of the aerator of FIG. 16.
Figure 19:
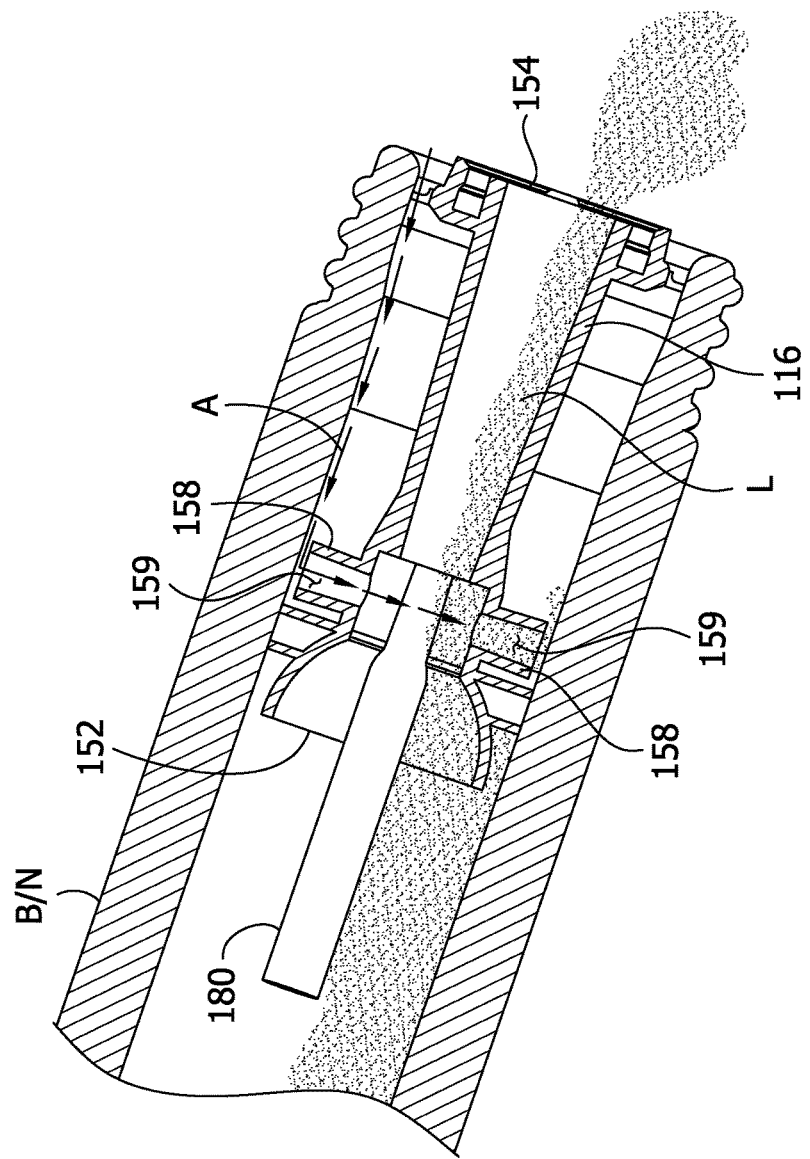
FIG. 19 is an illustration of the aeration of liquid being poured from a neck of a bottle through the aerator of FIG. 16.
Figure 20:
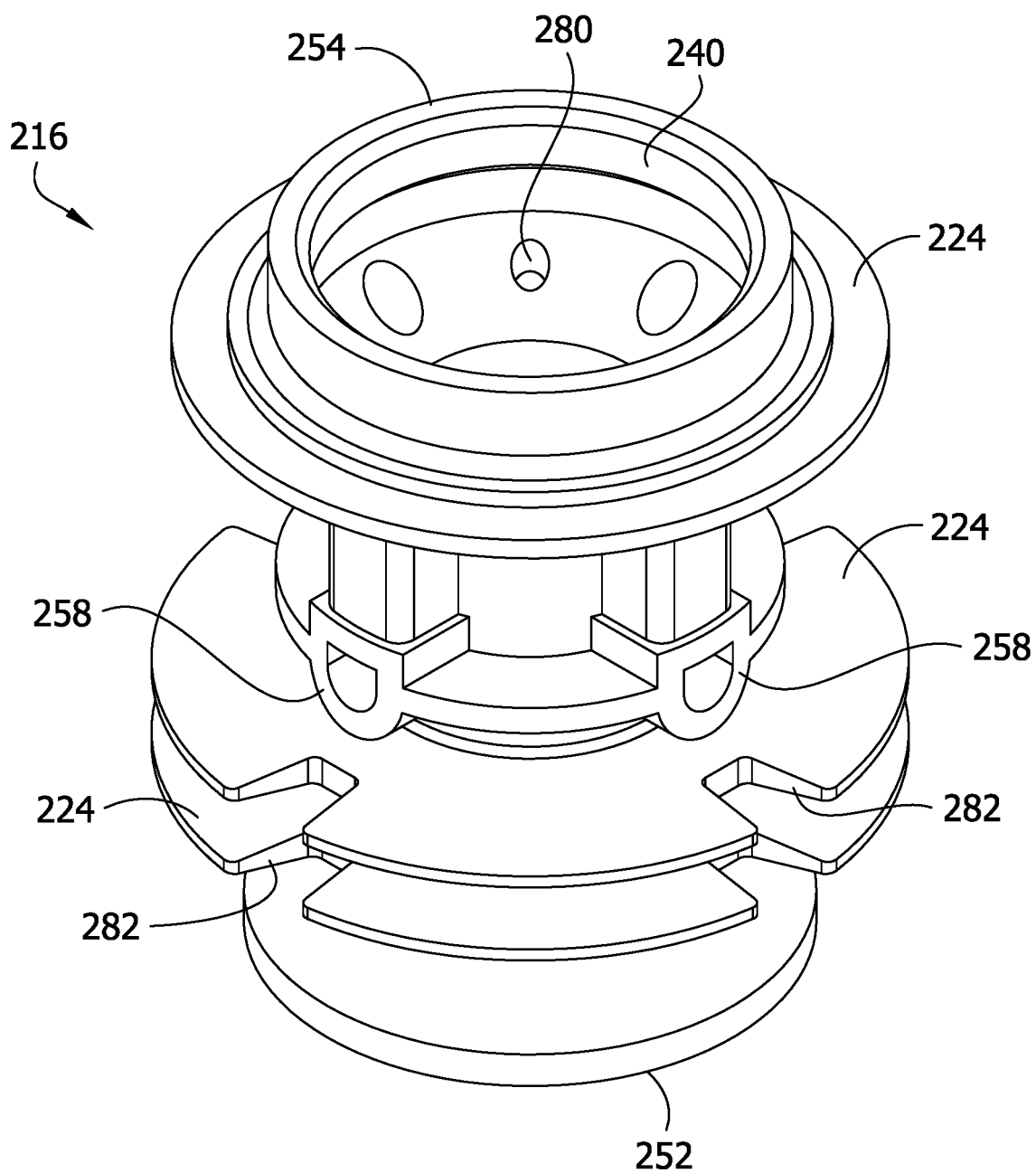
FIG. 20 is a perspective of an aerator of another embodiment.
Figure 21:
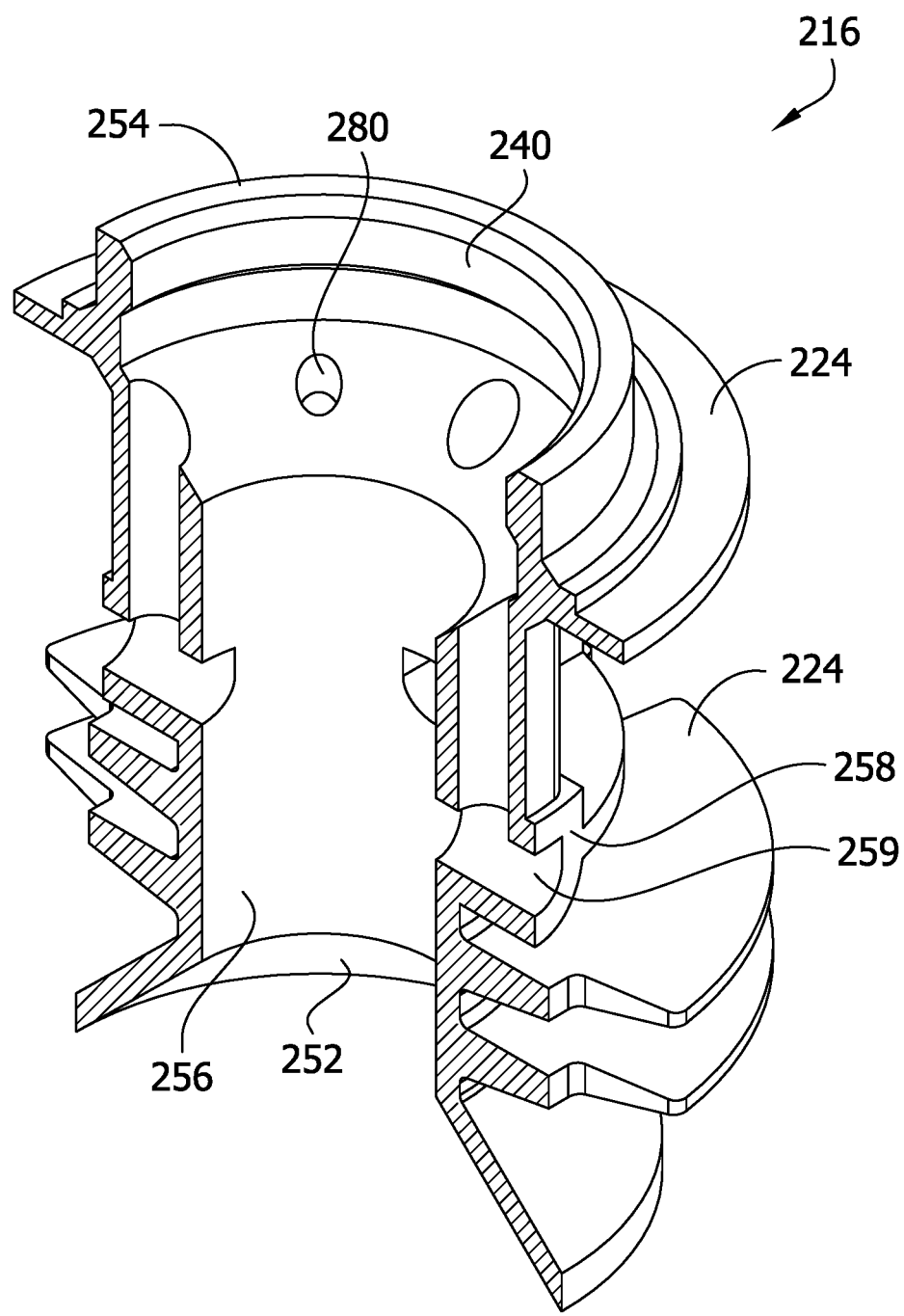
FIG. 21 is a section of the perspective of FIG. 20.
Figure 22:
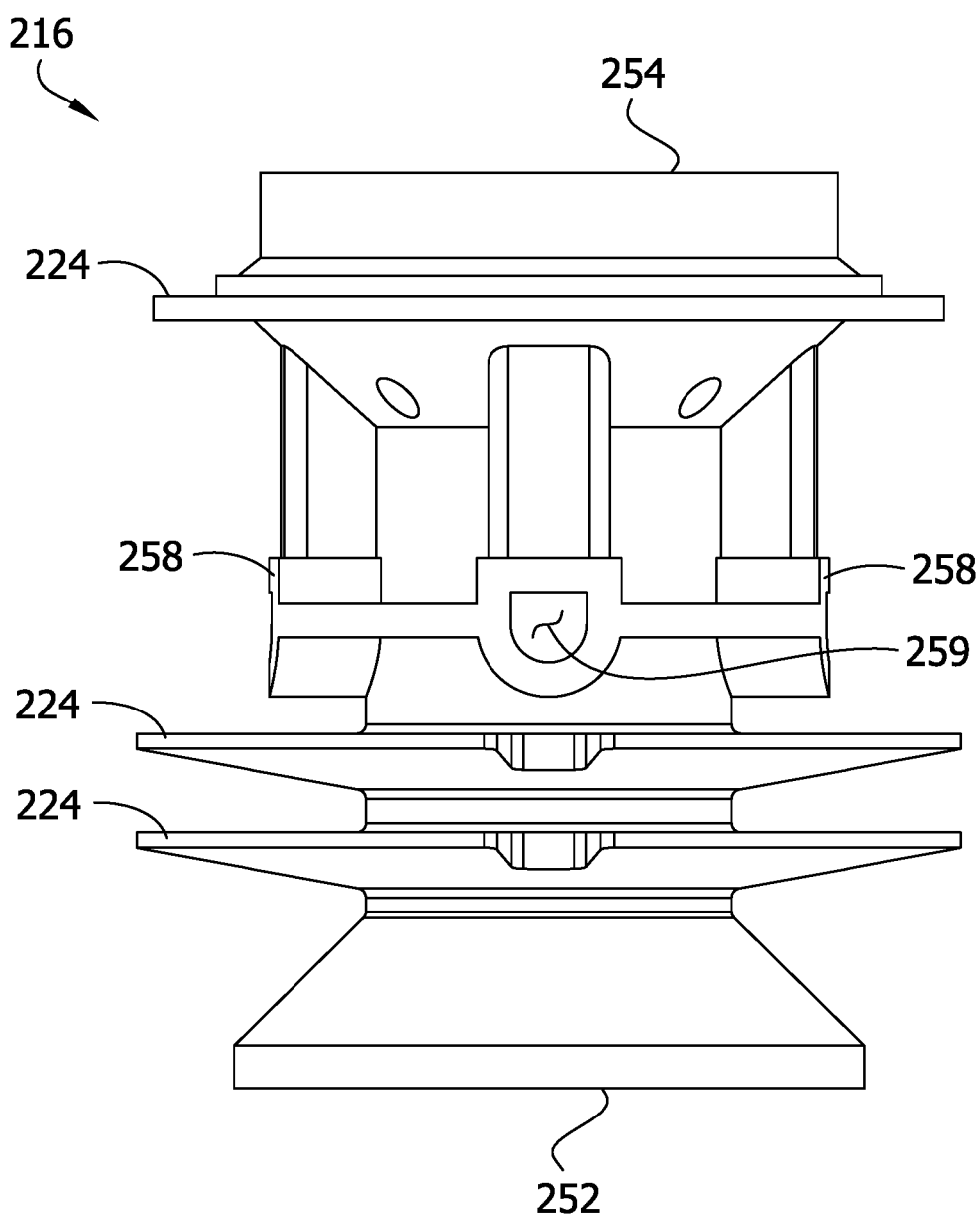
FIG. 22 is a side view of the aerator of FIG. 20.
Figure 23:
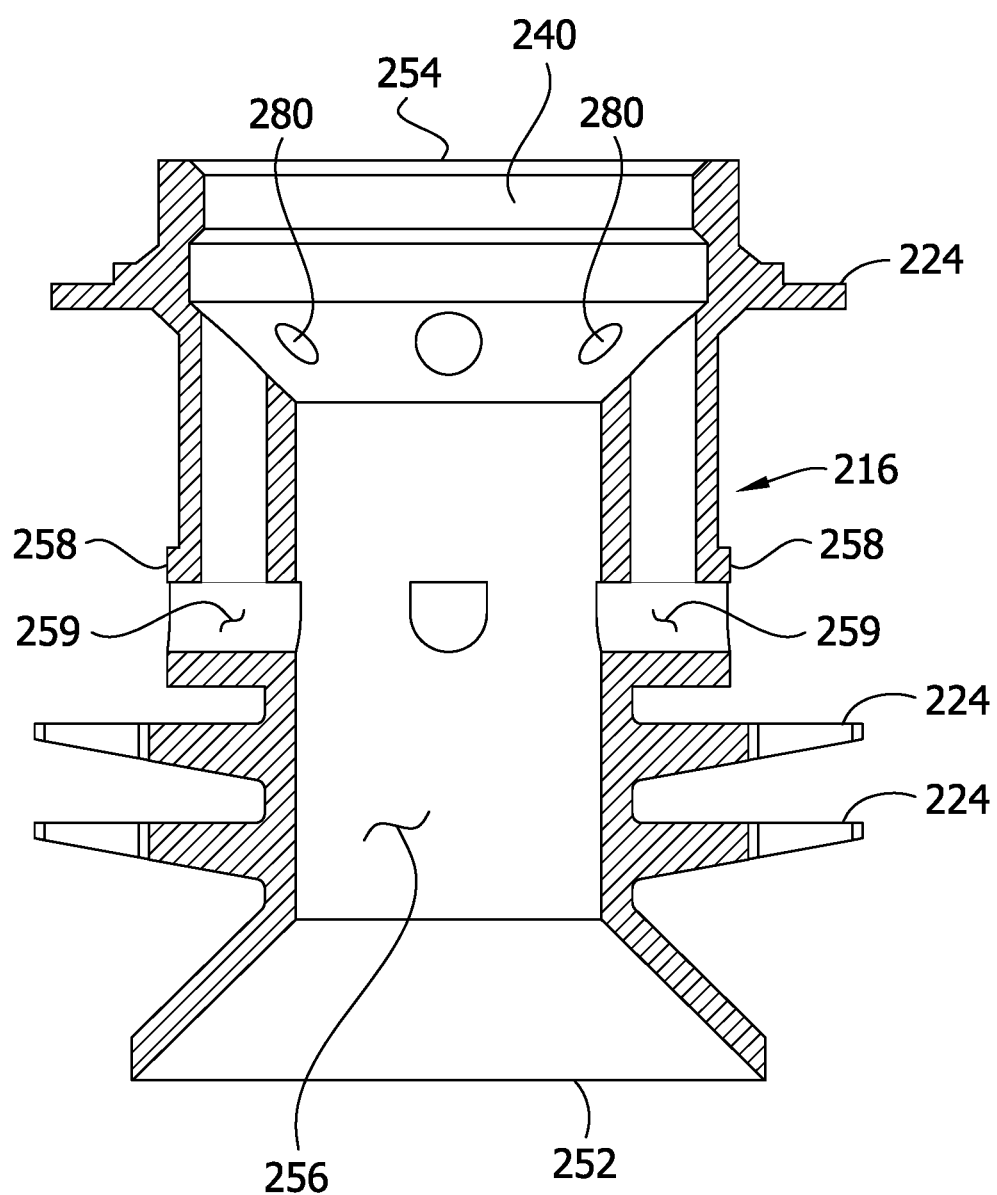
FIG. 23 is a section of the aerator of FIG. 20.
Figure 24:
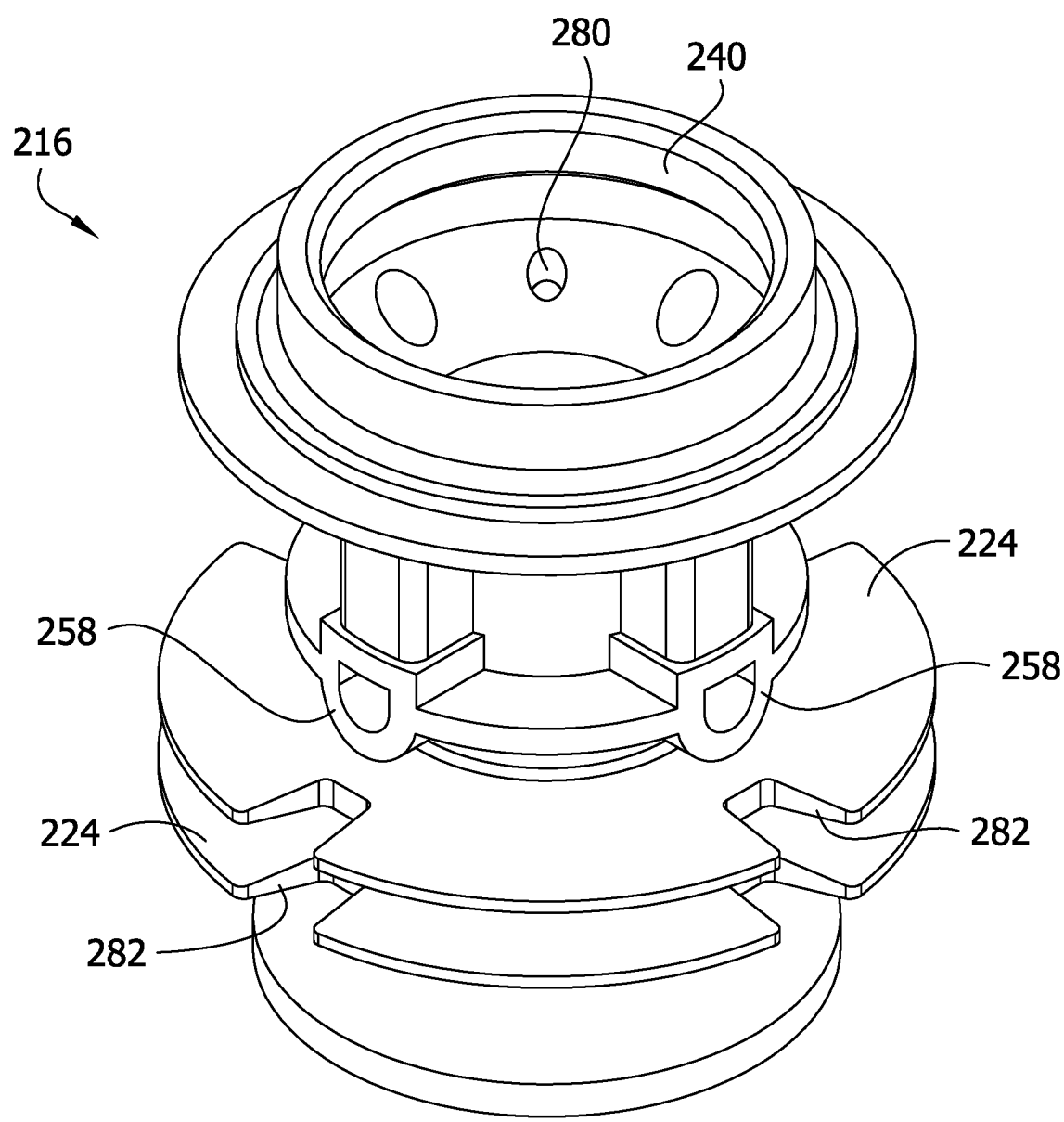
FIG. 24 is the perspective of FIG. 20 illustrating vents in the aerator.
Figure 25:
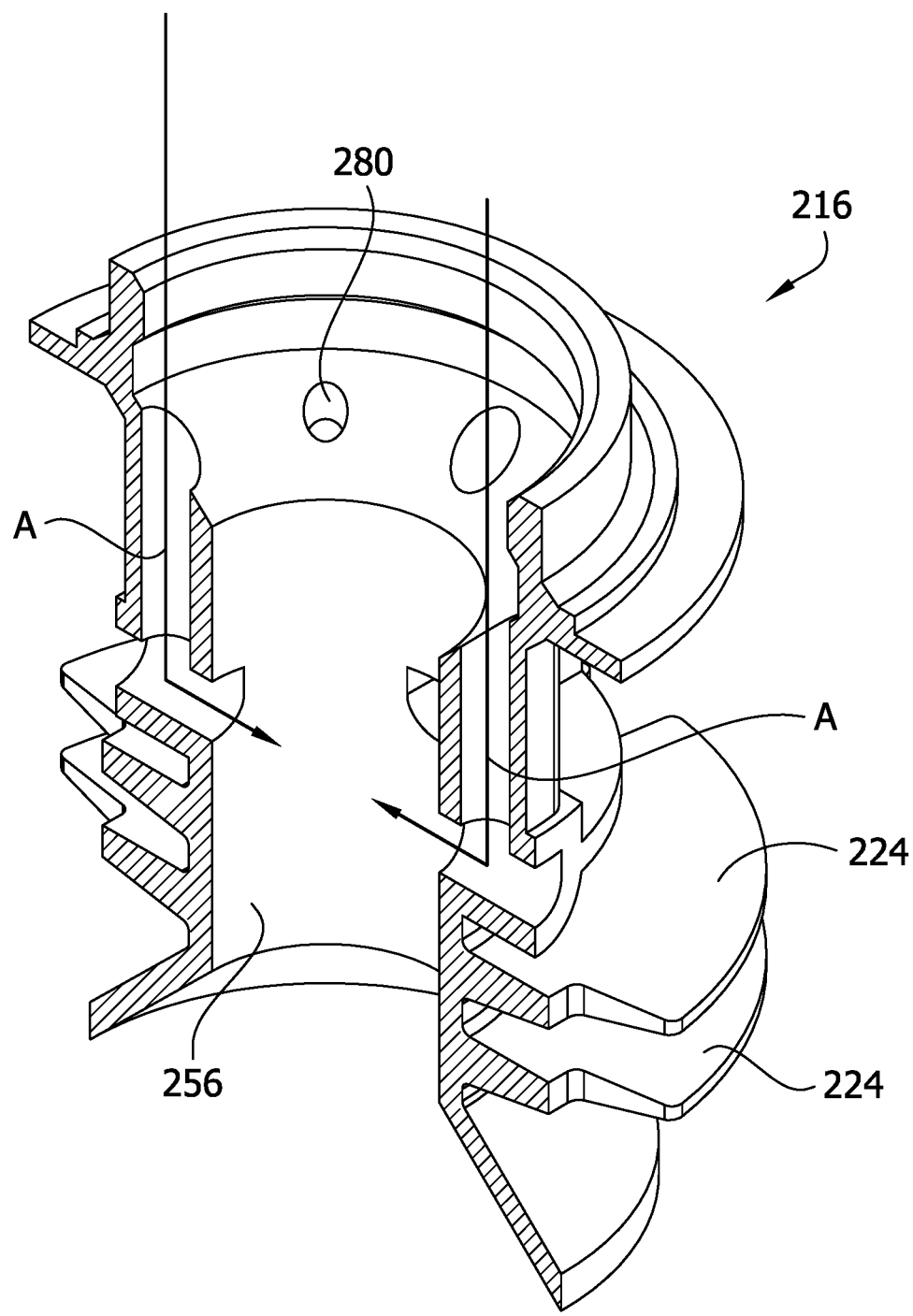
FIG. 25 is the section of FIG. 21 illustrating air flow through the aerator.
Figure 26:
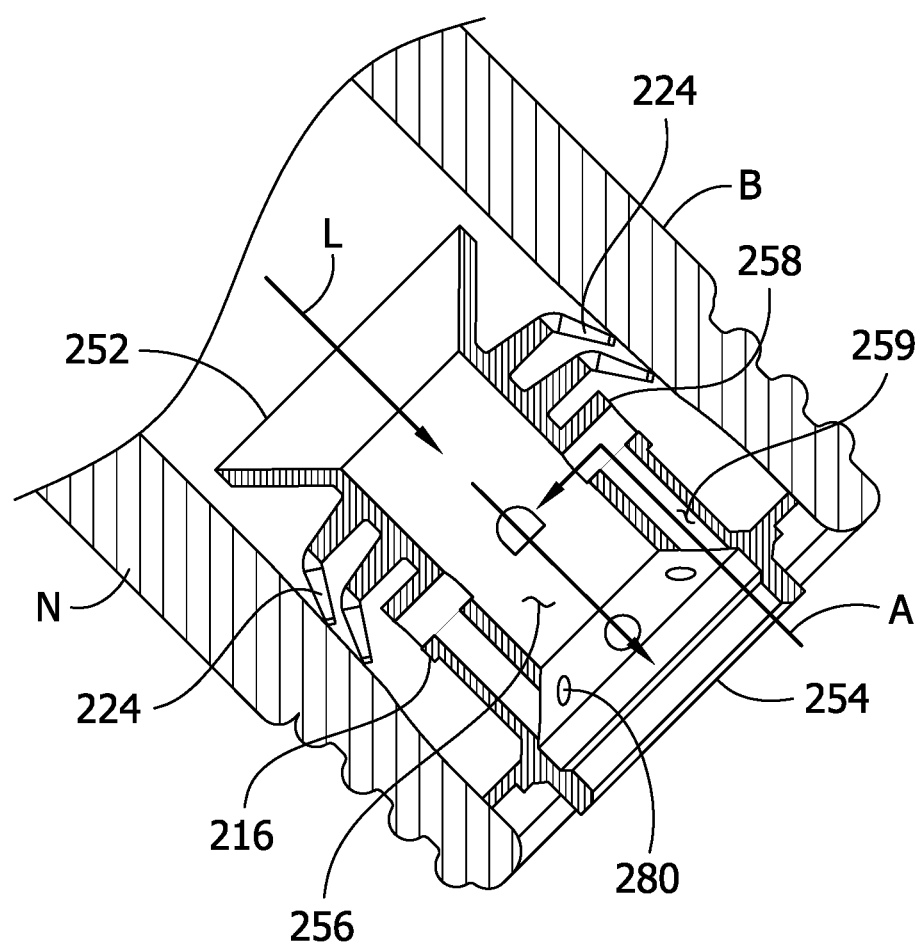
FIG. 26 is an illustration of the aeration of liquid being poured from a neck of a bottle through the aerator of FIG. 20.
Figure 27:
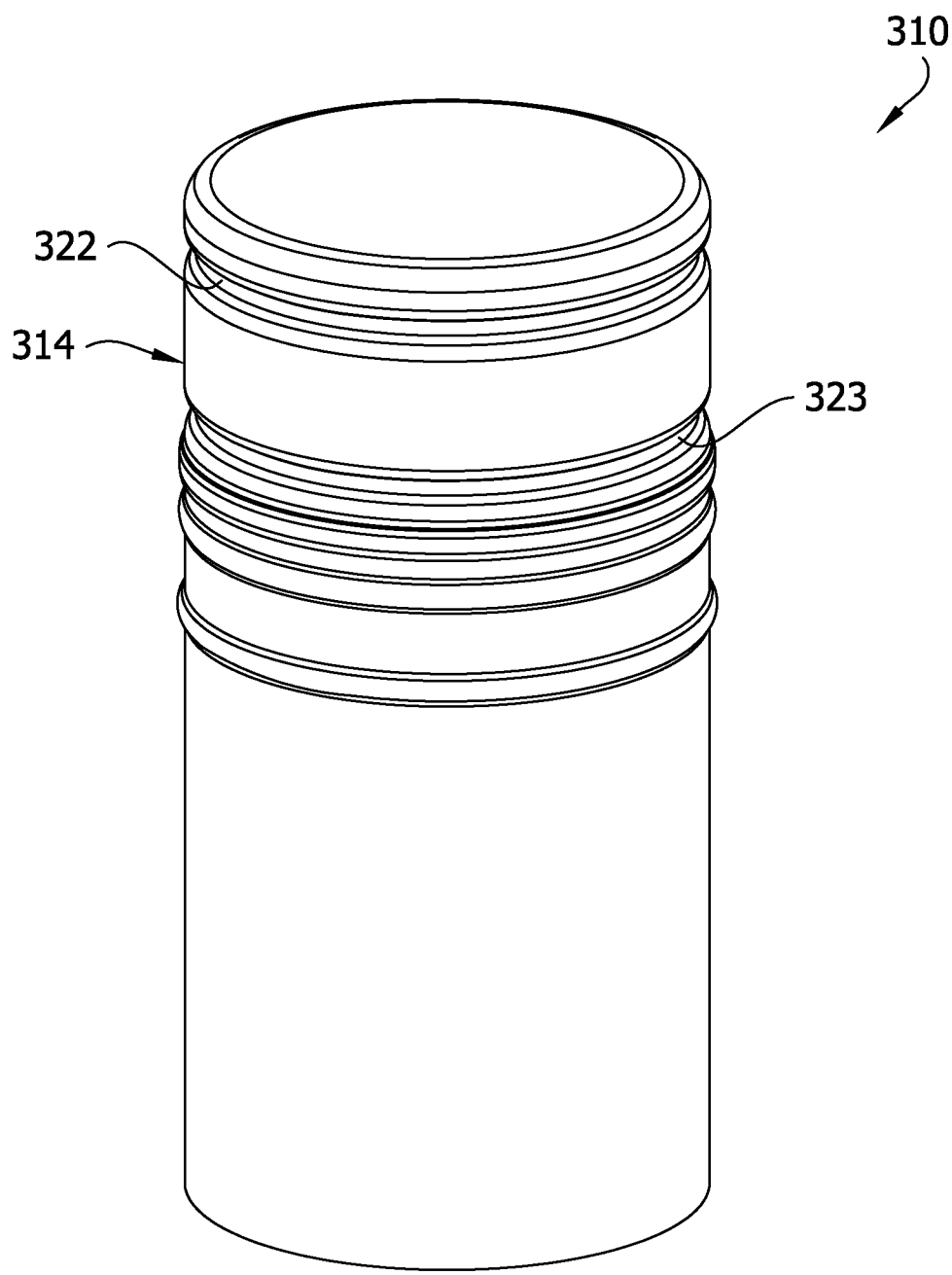
FIG. 27 is a perspective view of a shell assembly of another embodiment.
Figure 28:
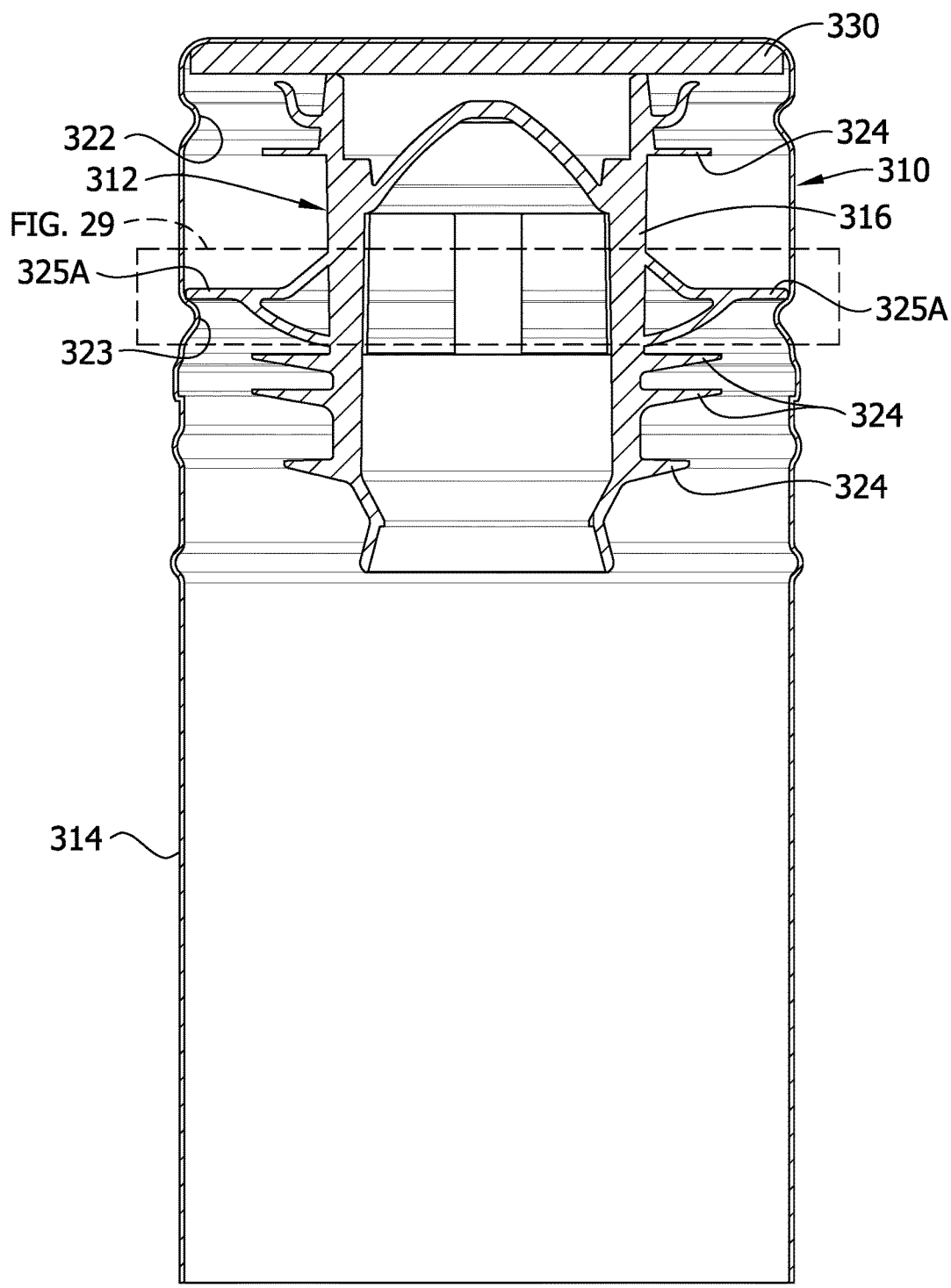
FIG. 28 is a section of the shell assembly of FIG. 27 with a flow control element removed.

A flow control element 70 is disposed within the flow control chamber 56. In one embodiment, the flow control element 70 comprises a glass ball. The flow control element 70 is moveable within the flow control chamber 56 between a first position (FIG. 6) and second position (FIG. 15). When the bottle B is oriented in an upright position, such as when the bottle is sitting on a table, gravity urges the flow control element 70 in the first position. In the first position, the flow control element 70 is disposed adjacent the inlet 52 and is retained in the flow control chamber 56 by the second diameter portion 66 of the first annular wall 57. The second diameter portion 66 has an inner diameter that is smaller than a diameter of the flow control element 70 so that the flow control element is prevented from falling out of the inlet 52. In the first position, the flow control element 70 blocks off fluid communication between the flow control chamber 56 and the inlet 52. Thus, the aerator 16 may also function as a refill-prevention device. Additionally or alternatively, when the flow control element 70 is in the first position, the element interacts with the body 26 of the aerator 16 to prevent oxygen transmission through the aerator into the bottle B. Thus, the flow control element 70 may provide an additional barrier to oxygen transmission.

Referring to FIG. 15, when it is desired to pour liquid L from the bottle B, the aerator 16 is positioned and configured to aerate the liquid as it is being poured. Tilting the bottle B to a pouring orientation causes the flow control element 70 to move within the flow control chamber 56 under the force of gravity to the second position where the flow control element is received within the cone-shaped portion 67 of the stop 60. In this position, the flow control chamber 56 remains in fluid communication with the outlet 54 through gaps 59 and openings 69. Thus, the liquid L in the bottle B can be poured out of the bottle with the flow control element 70 is in the second position. Further, the passage of liquid L from the bottle creates a vacuum that pulls air A into the flow control chamber 56 through the openings 69 and gaps 59 as the liquid L is being poured through the flow control chamber. Thus, the liquid L in the flow control chamber 56 mixes with the air A pulled into the flow control chamber to aerate the liquid. Additionally, the flow control element 70 causes the liquid L to flow around the element which thins out the flow of liquid allowing the air A pulled into the flow control chamber 56 to come into more intimate contact with a greater surface area of the liquid which in turn enhances aeration of the liquid. In an embodiment in which the flow control element 70 comprises a glass ball and the liquid comprises wine, the smooth outer surface of the glass ball facilitates wine flow around the ball, and the properties of the glass are such that the ball does not react with the wine.

Compared to aerators of the prior art, the aerator 16 is capable of more fully aerating the liquid as it is being poured from the bottle B. For example, in-bottle aerators in the prior art that use the venturi principle draw in significantly less air into the path of the liquid and place the air in contact with a significantly smaller surface area of the liquid. As a result, the liquid is not sufficiently aerated. By contrast, the moveable flow control element configuration of the present disclosure creates a vacuum causing a rapid flow of air to enter into a chamber of the aerator 16. Additionally, the spherical shape of the flow control element 70 alters the flow of liquid exiting the bottle B so that the air A in the aerator can mix more intimately with the liquid in the chamber. Thus, the aerator 16 is capable of achieving a degree of aeration on par with separate handheld/stand-alone and in-glass/decanter aerators. The in-bottle moveable flow control element configuration of the aerator 16 represents a significant deviation and improvement over aerators in the prior art.

Additionally or alternatively, the aerator 16 including the flow control element 70 may operate to control the rate of liquid flow out of the bottle B. For example, the aerator 16 may control liquid flow to about 10 ml/sec when the bottle B is oriented at a 45 degree pour angle. Thus, a standard alcohol measure of about 60 ml will consistently take about 6 second to pour when the aerator 16 is inserted into the bottle B. This would provide a reliable mechanism for approximating the amount of liquid poured from the bottle B.

Referring to FIGS. 16-19, an aerator of another embodiment is generally indicated at 116. The aerator 116 is configured for insertion into a neck N of a bottle B and is suitable for use with the mount assembly 18 of the previous embodiment. For example, the aerator 116 comprises a groove 140 similar to groove 40 described in the previous embodiment. The aerator 116 further comprises flanges 124 securing the aerator in the neck N of the bottle B. A fluid flow passage 156 extends through the aerator 116 from an inlet 152 to an outlet 154. A pair of side ports 158 define channels 159 that communicate with the fluid flow passage 156. The aerator 116 operates under the well-known Venturi principle to draw air into the fluid flow passage 156 though the channels 159 in the ports 158 to aerate liquid L as it is being poured from the bottle B. Vent tube 180 provides a vent passage 182 which prevents a vacuum from being formed when the liquid L is being poured from the bottle B.

Referring to FIGS. 20-26, an aerator of another embodiment is generally indicated at 216. The aerator 216 is configured for insertion into a neck N of a bottle B and is suitable for use with the mount assembly 18 of the first embodiment. For example, the aerator 216 comprises a groove 240 similar to groove 40 described in the first embodiment. The aerator 216 further comprises flanges 224 securing the aerator in the neck N of the bottle B. A fluid flow passage 256 extends through the aerator 216 from an inlet 252 to an outlet 254. Four side ports 258 define channels 259 that communicate with the fluid flow passage 256. The aerator 216 operates under the well-known Venturi principle to draw air into the fluid flow passage 256 though the channels 259 in the ports 258 to aerate liquid L as it is being poured from the bottle B. Vent holes 280 and flange cut outs 282 provides a vent passage which prevents a vacuum from being formed when the liquid L is being poured from the bottle B.

Referring to FIGS. 27-31, a shell assembly of another embodiment is generally indicated at 310. Just as in the first embodiment, the shell assembly 310 is mounted on a neck N of a container or bottle B for locating an aerator assembly, generally indicated at 312, at least partially in the neck of the bottle for aerating liquid in the bottle when the liquid is poured from the bottle. The shell assembly 310 comprises a shell 314 and the aerator assembly 312 including an aerator 316. The shell assembly 310 is configured to locate the aerator 316 of the aerator assembly 312 at least partially in the neck N of the bottle B during the bottling process. The aerator 316 is configured substantially identical to and operates substantially the same as the aerator 16 of the first embodiment. However, different form the aerator 16 of the first embodiment, aerator 316 is not used with the mount assembly 18 of the first embodiment to retain the aerator to the shell 314. Instead, the aerator 316 includes two additional pairs of flanges 325A, 325B which engage an additional bead 323 on the shell 314 to retain the aerator to the shell prior to the shell assembly 310 being pressed onto the neck N of the bottle B.

To secure the aerator 316 to the shell 314, the aerator is inserted into the shell until the flanges 325A, 325B are moved past bead 323. Moving the flanges 325A, 325B past the bead 323 will cause the flanges to flex downward allowing for the necessary clearance for the flanges to pass the bead. Once the flanges 325A, 325B are moved past the bead 323, the engagement the flanges and the bead will retain the aerator to the shell 314. In particular, the bead 323 extends into an interior space of the shell 314 so that bottom surfaces of the flanges 325A, 325B will engage an upper surface of the bead 323 preventing the aerator 316 from falling out of the shell 314. Bead 322 retains seal 330 to the shell 314 in a similar fashion. Once the shell assembly 310 is pressed onto the neck N of the bottle B, the flanges 325, 324 engage an interior surface of the neck N to secure the aerator 316 in the neck of the bottle. With the aerator 316 disposed in the bottle B, liquid in the bottle can flow through the aerator and be aerated as the liquid is being poured from the bottle.

Figure 29:
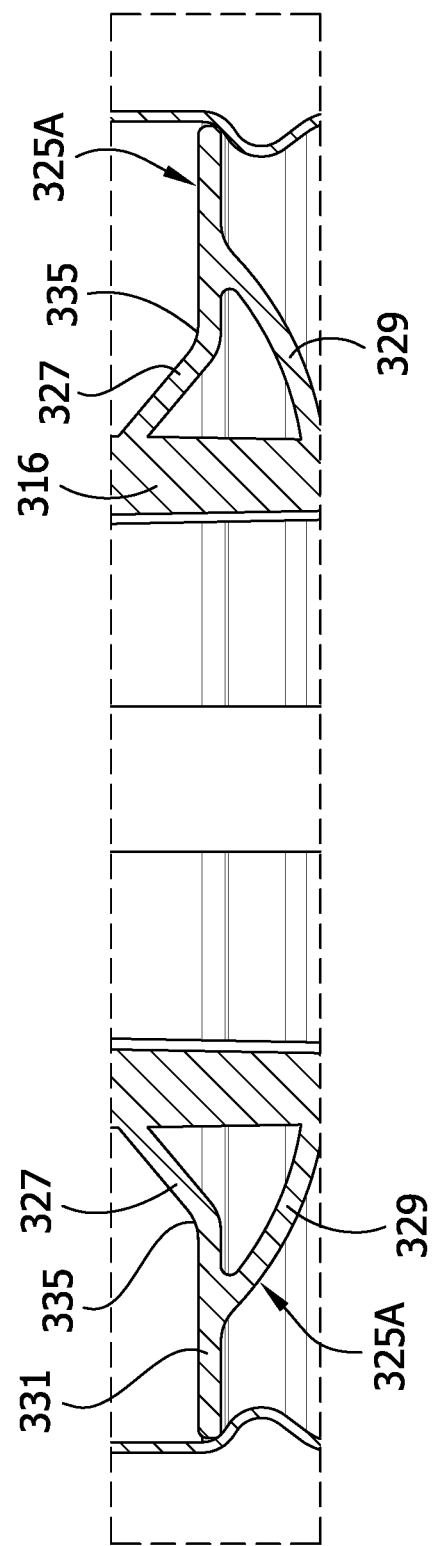
FIG. 29 is an enlarged fragmentary view of FIG. 28.
Figure 30:
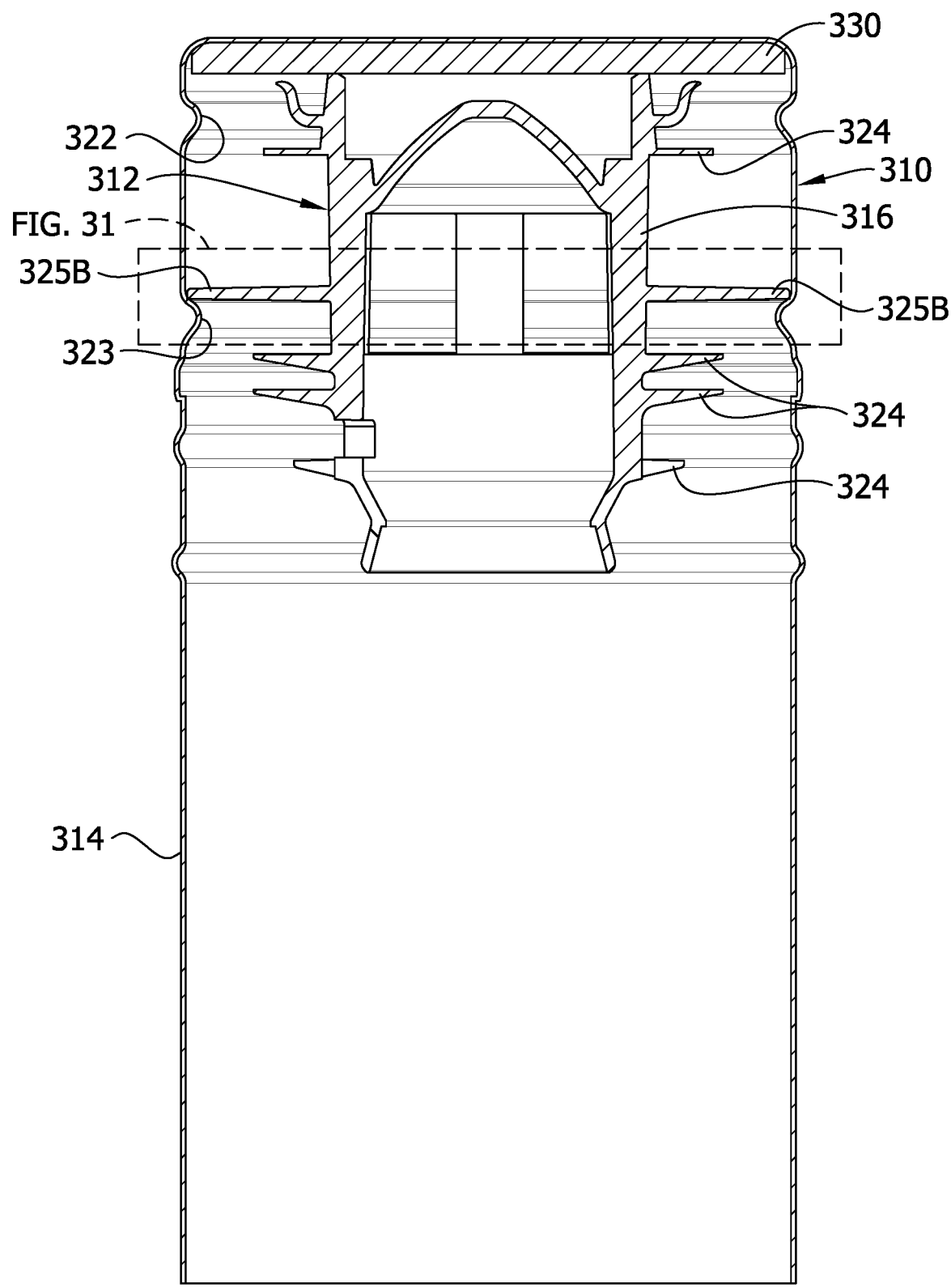
FIG. 30 is a section of the shell assembly of FIG. 27 taken in plane rotated 90 degrees from the section of FIG. 28.
Figure 31:
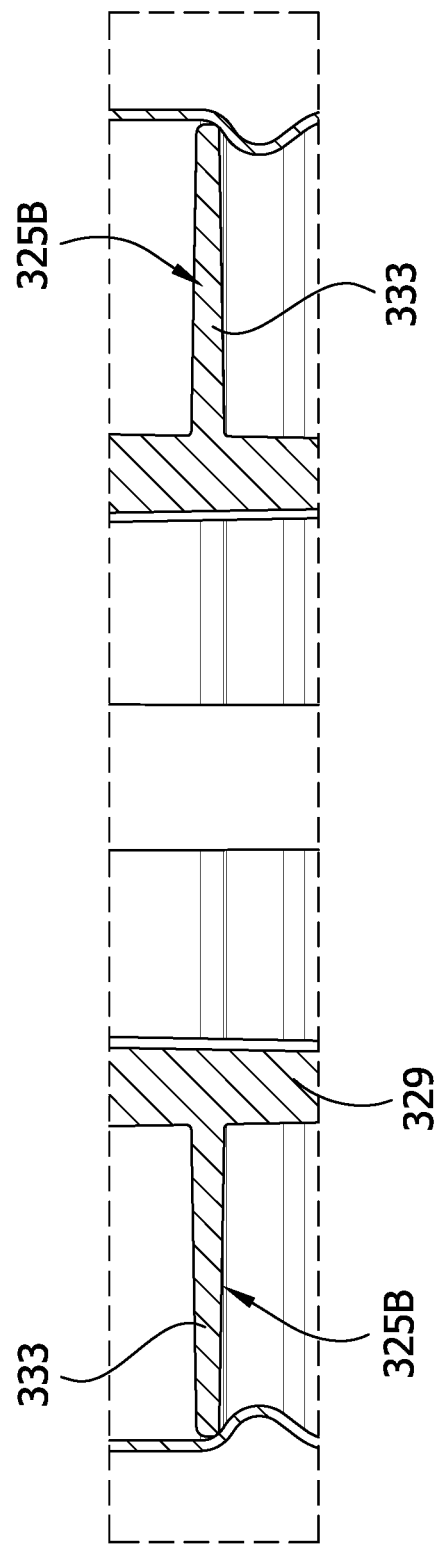
FIG. 31 is an enlarged fragmentary view of FIG. 30.

Flanges 324 are configured to flex upwardly when the aerator 316 is inserted into the neck N of the bottle B providing a resistive force against pulling the aerator 316 out of the bottle. In the illustrated embodiment, the bottom three flanges 324 are flexed upwardly while top flange 324 is sized to remain substantially horizontal inside the neck N. Flanges 325 comprise a first pair of flanges 325A and a second pair of flanges 325B. The first pair of flanges 325A each have a wishbone shape in cross section and include an upper attachment arm 327 extending downward and laterally outward from the aerator 316, and a lower attachment arm 329 extending upward and laterally outward from the aerator (FIG. 29). The upper and lower attachment arms 327, 329 converge at their ends. A shell engagement arm 331 extends laterally outward from the ends of the upper and lower attachment arms 327, 329. Flanges 325B include a single shell engagement arm 333 that extends laterally outward from the aerator 316 (FIG. 31). In the illustrated embodiment, the shell engagement arm 333 extends generally perpendicularly from the aerator 316. However, the arm 333 could extend from the aerator 316 at other angles without departing from the scope of the disclosure.

The first pair of flanges 325A are configured to flex upward at a bend 335 in the upper attachment arms 327 when the aerator 316 is inserted into the neck N of the bottle B. The second pair of flanges 325B are also configured to flex upward when the aerator 316 is inserted into the neck N of the bottle B. However, the construction of the first pair of flanges 325A makes the flanges more flexible than the second pair of flanges 325B. Thus, the first pair of flange 325A flex upwardly more easily than the second pair of flanges 325B. Therefore, the first pair of flanges 325A help to reduce the insertion force required to insert the aerator 316 into the bottle B. The first pair of flanges 325A could have other configurations without departing from the scope of the disclosure.

In the illustrated embodiment, two pairs of flanges 325A, 325B are shown, each pair having a different configuration. However, it is envisioned that each flange could have the same configuration. For example, each flange could have the configuration of the first pair of flanges 325A, or each flange could have the configuration of the second pair of flanges 325A. Alternatively, any number of flanges having any combination of configurations could be used. Alternatively, instead of multiple discrete flanges 325, a single continuous flange extending around the circumference of the aerator 316 could be used.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. An aerator assembly comprising:
an aerator for aerating a liquid as the liquid is being poured from a bottle, the aerator including
an aerator body configured to be at least partially inserted into the bottle, the body comprising an inlet, an outlet, and a flow control chamber disposed between the inlet and the outlet, the flow control chamber being at least partially defined by a stop adjacent the outlet, the flow control chamber being configured to pass liquid from the bottle when the aerator is inserted into the bottle and the bottle oriented for pouring liquid from the bottle; and
a flow control element movably disposed in the flow control chamber between a first position where the flow control element is spaced away from the stop and a second position where the flow control element engages the stop, the flow control element moving to the second position when the bottle is oriented for pouring liquid from the bottle, the flow control chamber communicating with the outlet when the flow control element is in the second position allowing liquid to be poured from the bottle and allowing air to be introduced into the flow control chamber for mixing with the liquid being poured from the bottle to aerate the liquid being poured from the bottle; and
a mount releaseably attachable to the aerator, the mount being configured to attach the aerator to a cap for the bottle, the releaseable attachment between the mount and aerator causing the mount to detach from the aerator when the cap is removed from the bottle retaining the mount with the cap and leaving the aerator at least partially in the bottle.

2. The assembly of claim 1, wherein a liquid flow passage extends from the inlet, to the flow control chamber, around the flow control element, to the outlet allowing liquid in the bottle to exit the outlet of the aerator when the flow control element is in the second position.

3. The assembly of claim 2, wherein an air flow passage extends from the outlet to the flow control chamber allowing air to enter the flow control chamber to mix with liquid in the flow control chamber when the flow control element is in the second position.

4. The assembly of claim 1, wherein the flow control element comprises a ball.

5. The assembly of claim 1, wherein, in the second position, the flow control element is configured to create a vacuum in the flow control chamber drawing air into the flow control chamber to aerate liquid in the flow control chamber.

6. The assembly of claim 1, wherein the flow control chamber is further defined by an annular wall adjacent the inlet and a plurality of discrete side walls extending from the annular wall to the stop.

7. The assembly of claim 6, wherein the stop comprises a cup member configured to releasably hold the flow control element in the second position.

8. The assembly of claim 6, wherein the flow control element comprises a ball, the annular wall having an inner diameter smaller than a diameter of the ball to retain the ball in the flow control chamber.

9. The assembly of claim 1, wherein the bottle is a wine bottle, such that the aerator body is sized and shaped to be inserted into a neck of the wine bottle, the aerator further comprising flanges on the aerator body for engaging and sealing with the neck of the wine bottle when the aerator body is inserted into the neck of the wine bottle.

10. The aerator assembly of claim 1, wherein one of the mount and the aerator has a rib and the other of the mount and the aerator has a groove, the rib being removeably received in the groove to attach the mount to the aerator.

11. The aerator assembly of claim 1, further comprising a seal retained between the mount and the aerator when the mount is attached to the aerator, the seal being configured to engage and seal a rim of the bottle when the mount is attached to the aerator and the aerator is at least partially inserted into the bottle.

12. The aerator assembly of claim 11, wherein the seal comprises a laminate comprising a ring formed from extruded compressible material, a first tin layer disposed on a top surface of the ring, and a second tin layer disposed on a bottom surface of the ring.

13. The aerator assembly of claim 11, wherein the mount comprises a disc member and an annular projection extending from a bottom surface of the disc member, the seal being received around the annular projection positioning the seal concentrically with the mount.

14. The aerator assembly of claim 1, in combination with a shell, the aerator assembly being secured within an interior of the shell.

15. The aerator assembly of claim 14, wherein the shell comprises a bead, the mount being engageable with the bead to secure the aerator assembly within the interior of the shell.

16. The aerator assembly of claim 14, further comprising a seal retained between the mount and the aerator when the mount is attached to the aerator, the seal being configured to engage and seal a rim of the bottle when the shell is finally attached to the bottle, wherein the seal is configured to prevent oxygen transfer into the bottle.

17. The aerator assembly of claim 16, wherein the seal is configured to compress and conform around the rim of the bottle when the shell is attached to the bottle.

18. The aerator assembly of claim 1, wherein the mount comprises at least one of a coating and metallic finish, the coating and metallic finish on the mount being configured engage and seal a rim of the bottle when the mount is attached to the aerator and the aerator is at least partially inserted into the bottle, and wherein the coating and metallic finish are applied to the mount in a selected pattern to permit a selected amount of oxygen transmission into the bottle.

19. The aerator assembly of claim 1, wherein the releasable attachment between the mount and the aerator provides a liquid seal between the mount and aerator preventing liquid from flowing through the releaseable attachment when the mount is attached to the aerator.

* * * * *